United States Patent
Komiya et al.

(10) Patent No.: US 6,611,279 B2
(45) Date of Patent: Aug. 26, 2003

(54) LIGHT BEAM SCANNING APPARATUS

(75) Inventors: Kenichi Komiya, Kawasaki (JP); Koji Tanimoto, Kawasaki (JP); Daisuke Ishikawa, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 59 days.

(21) Appl. No.: 09/966,096

(22) Filed: Oct. 1, 2001

(65) Prior Publication Data

US 2003/0063298 A1 Apr. 3, 2003

(51) Int. Cl.⁷ .............................................. B41J 2/435
(52) U.S. Cl. ...................................... 347/235; 347/250
(58) Field of Search ................................ 347/235, 233, 347/234, 237, 247, 248, 250; 359/205, 250, 229, 248

(56) References Cited

U.S. PATENT DOCUMENTS

| | | | |
|---|---|---|---|
| 5,929,891 A | * 7/1999 | Komiya et al. | 347/235 |
| 6,462,855 B1 | 10/2002 | Komiya et al. | 359/212 |
| 6,496,212 B1 | 12/2002 | Tanimoto et al. | 347/234 |
| 6,509,921 B2 | * 1/2003 | Komiya et al. | 347/235 |

* cited by examiner

*Primary Examiner*—Lamson Nguyen
(74) *Attorney, Agent, or Firm*—Foley & Lardner

(57) ABSTRACT

The sensor for converting a light beam into an electric signal is formed by a pair of symmetrical saw-toothed patterns with a narrowed width for marginally located teeth. The patterns are arranged interdigitally on the surface to be scanned or at a position equivalent to the surface. The difference of the output signals from the patterns is integrated to determine the scanning position of the light beam.

26 Claims, 22 Drawing Sheets

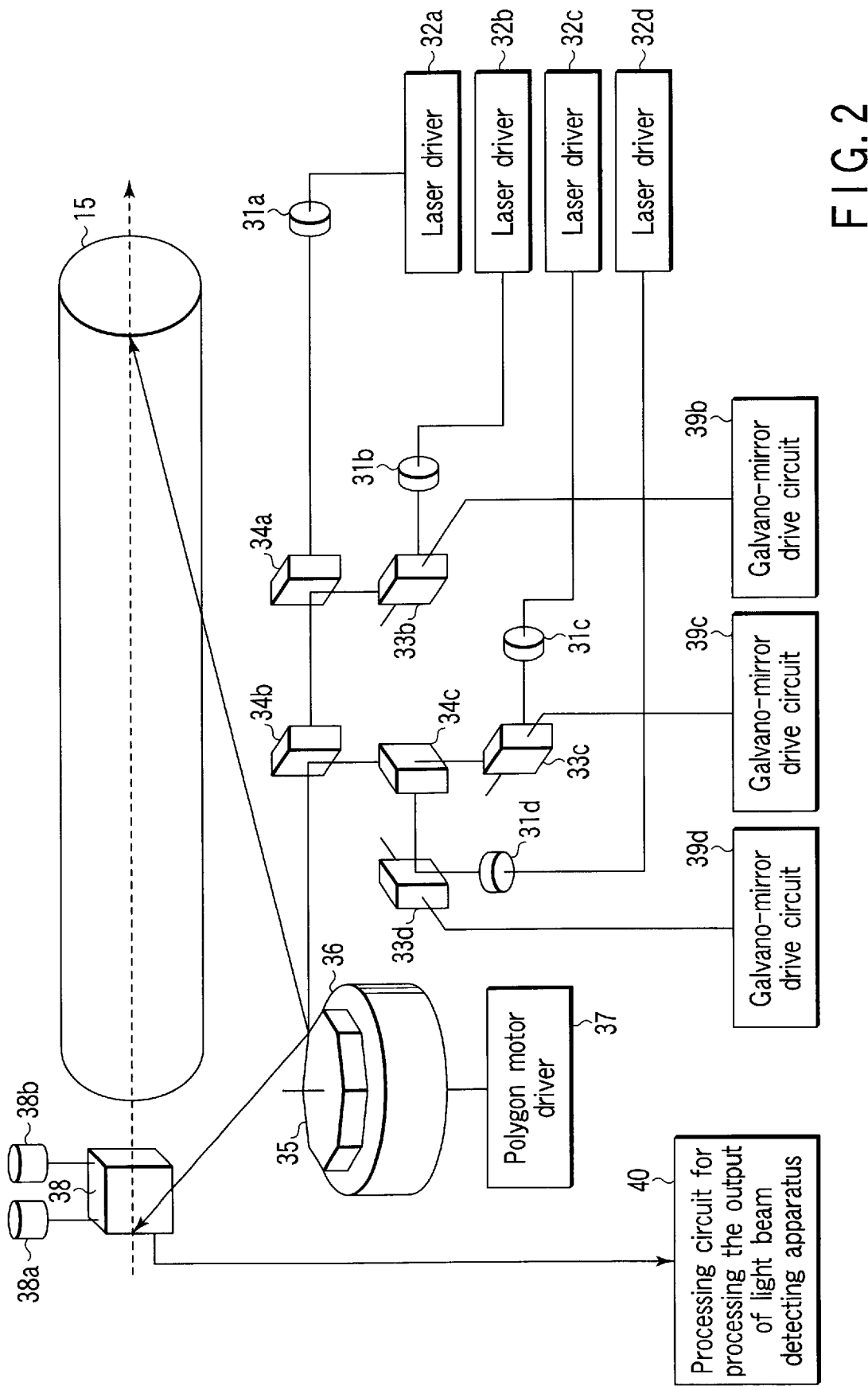
F I G. 2

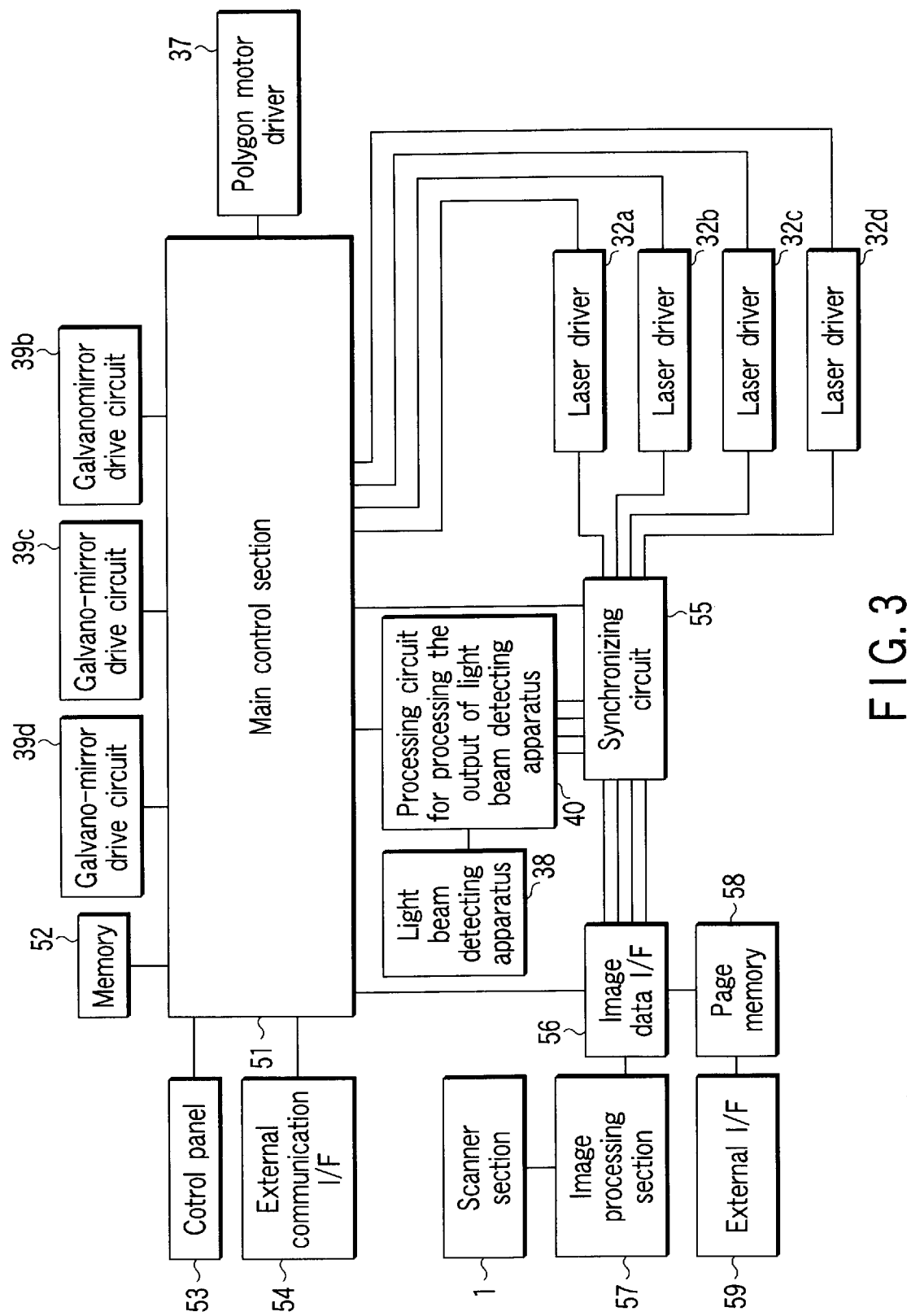
F I G. 3

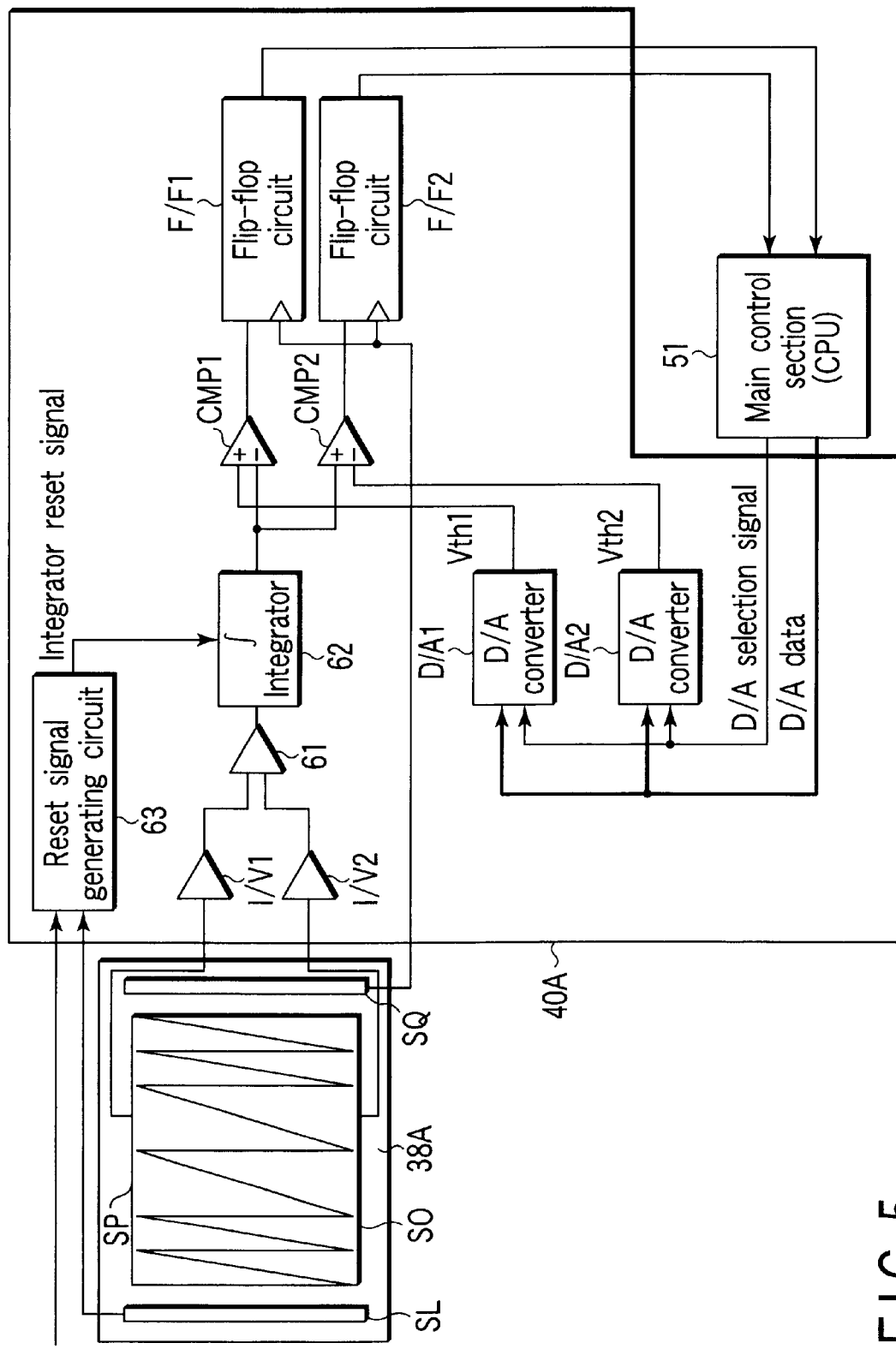
F I G. 5

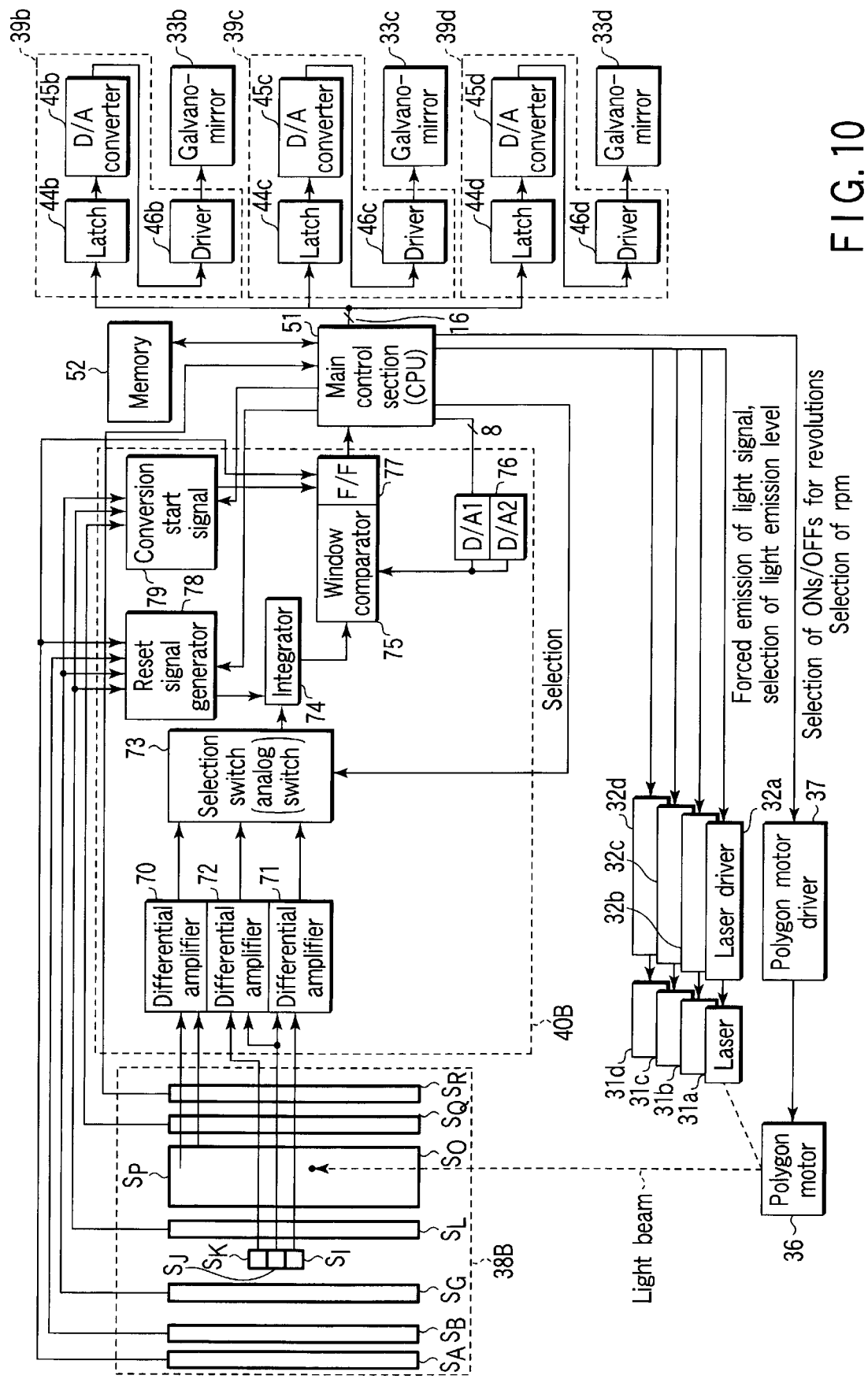
F I G. 10

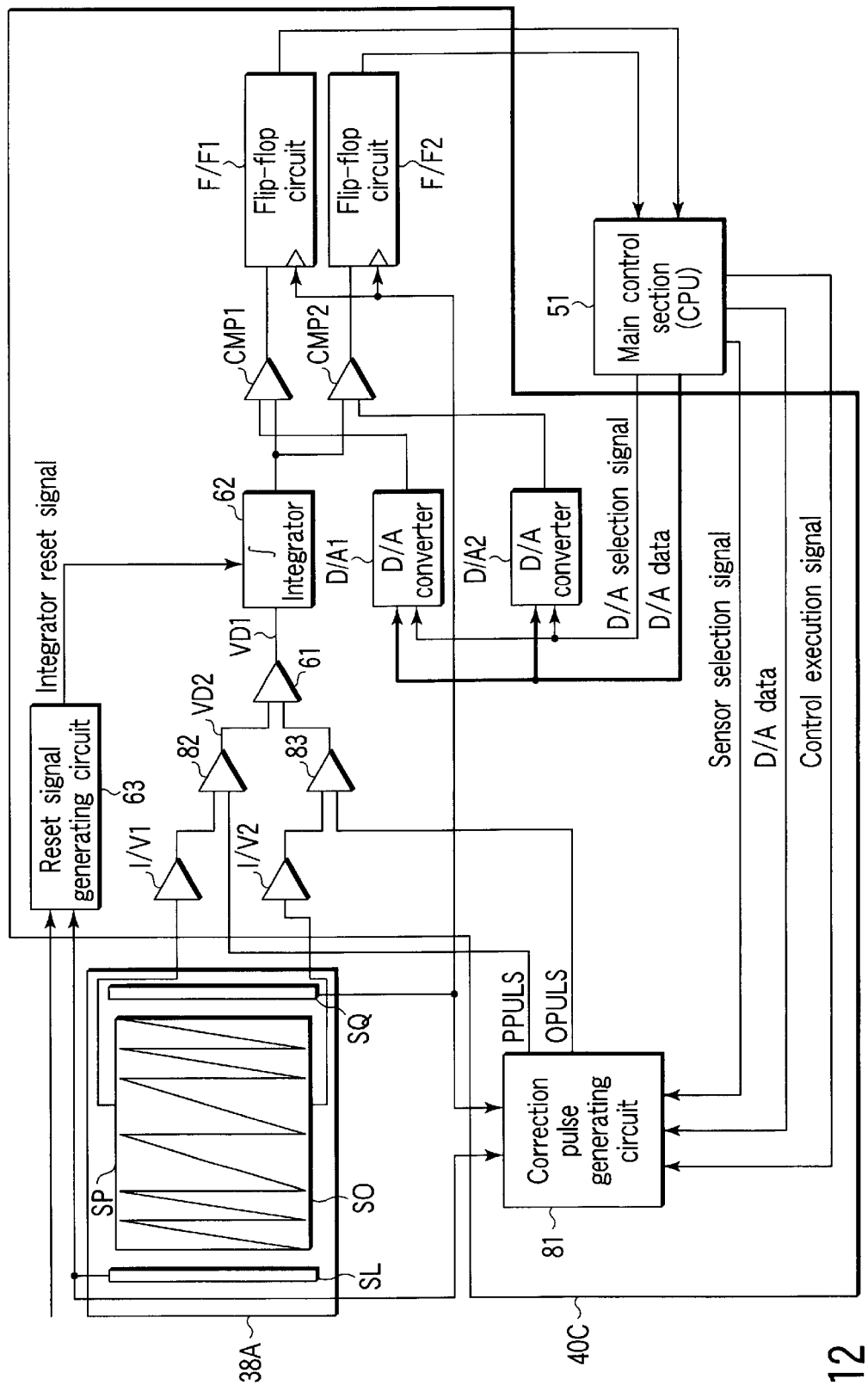
F I G. 12

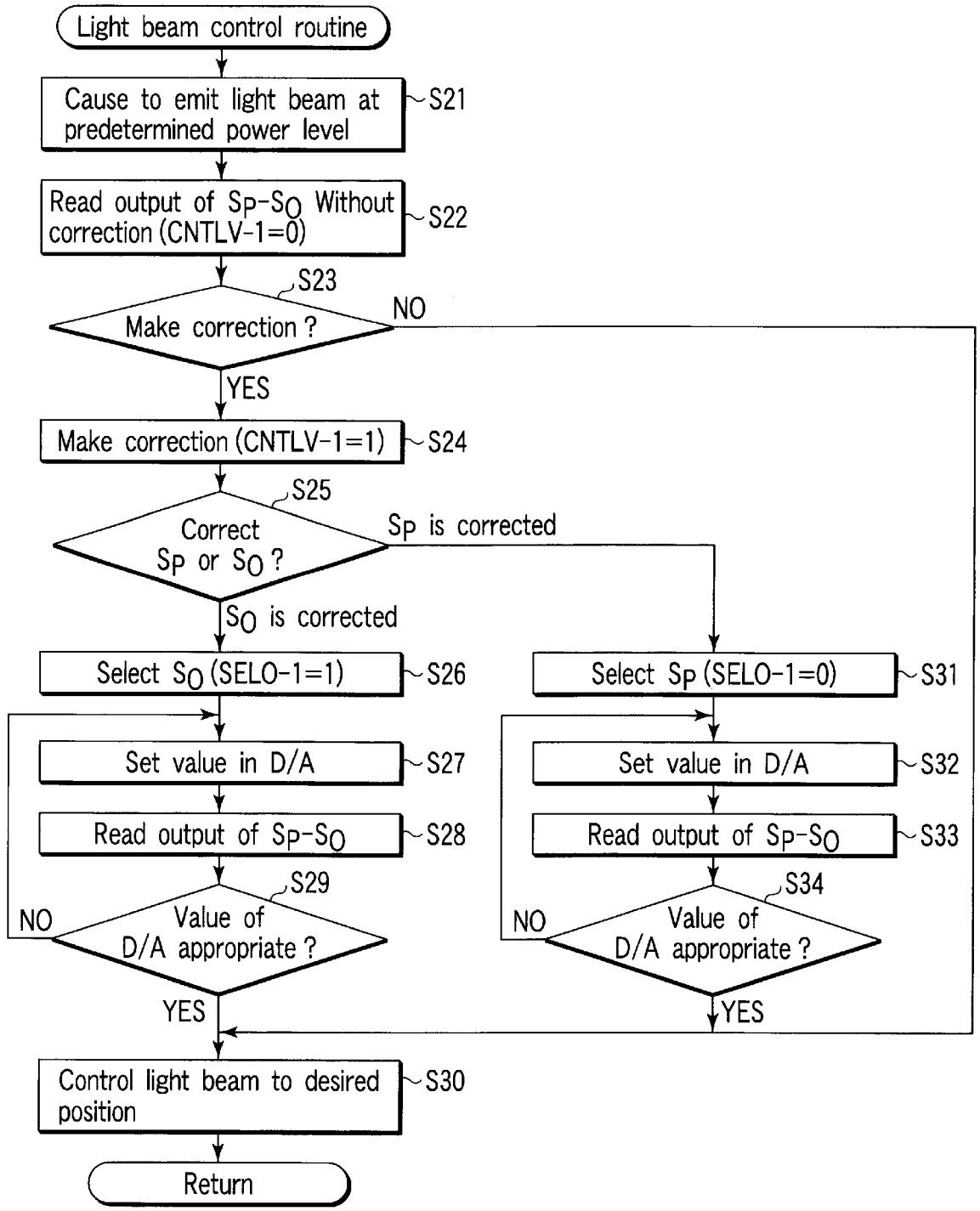
F I G. 15

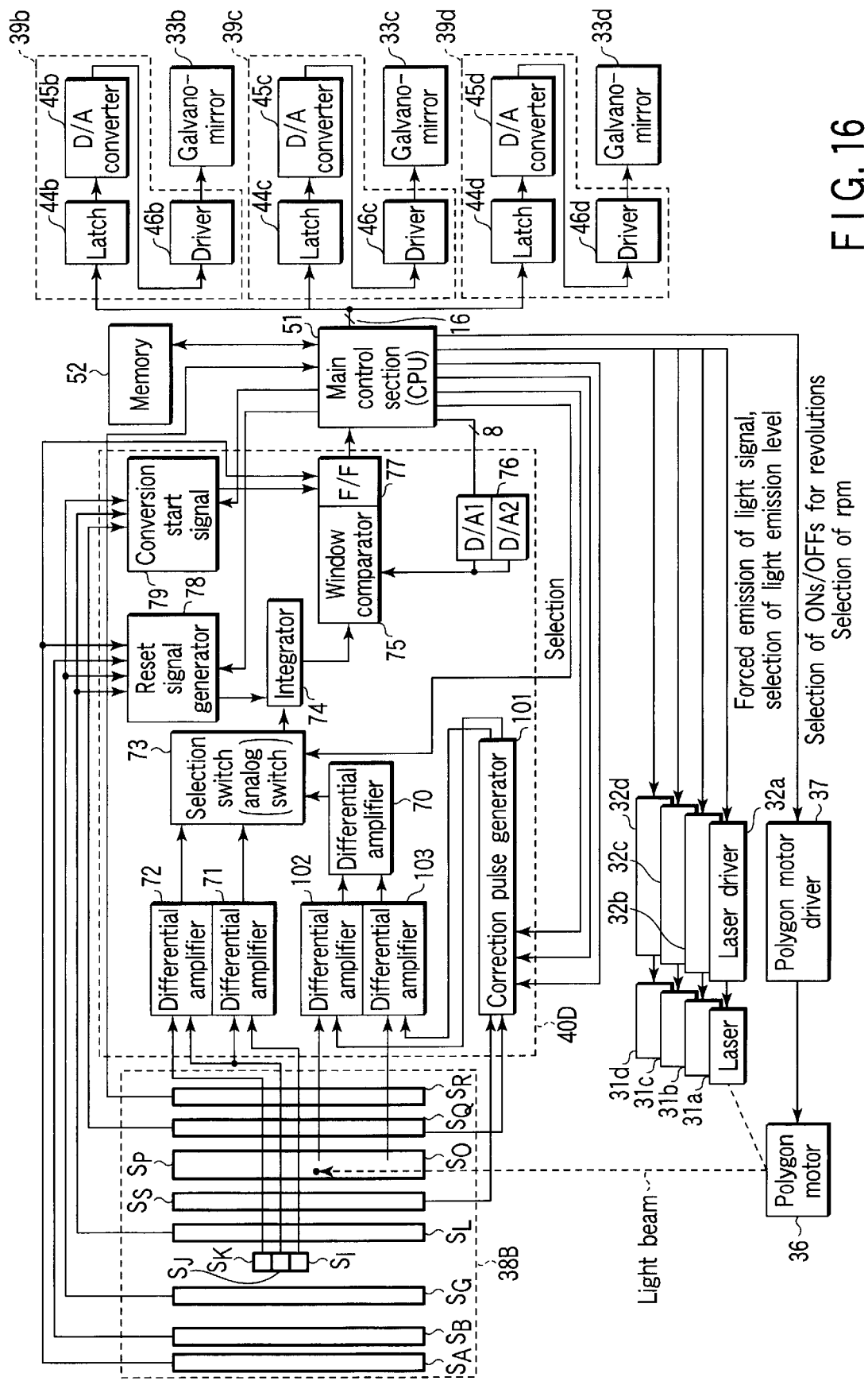
F I G. 16

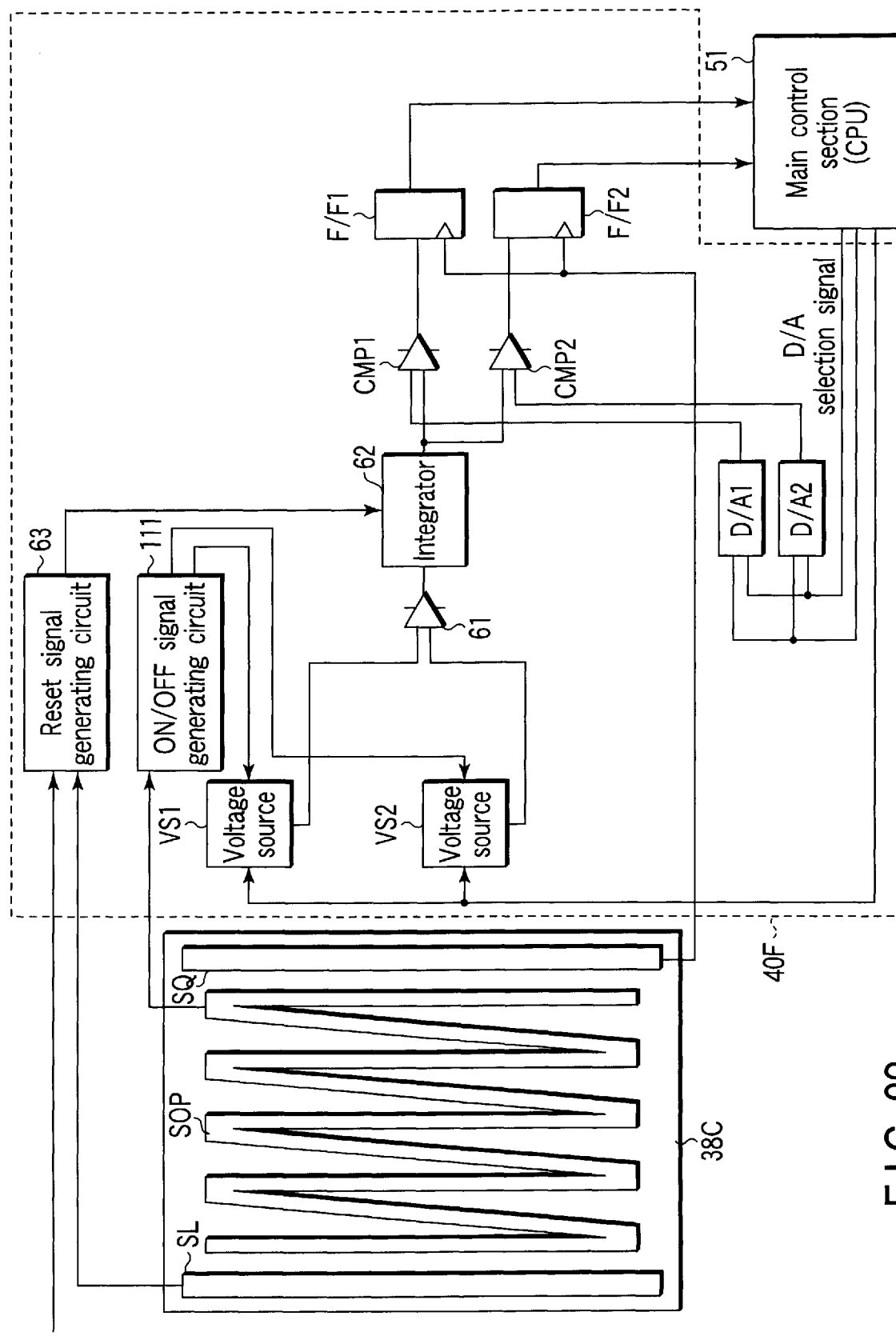
F I G. 22

LIGHT BEAM SCANNING APPARATUS

BACKGROUND OF THE INVENTION

This invention relates to a light beam scanning apparatus to be suitably used for an image forming apparatus such as a digital copying machine or a laser printer adapted to scan a photosensitive drum by means of a laser beam for exposure and form an electrostatic latent image on the photosensitive drum.

In recent years, there have been developed various digital copying machines provided with a light beam scanning apparatus for scanning an object by means of a laser beam (to be referred to simply as light beam) for exposure adapted to form an image by way of an electrophotography process.

There have been also developed various digital copying machines provided with a multi-beam type light beam scanning apparatus adapted to generate a plurality of light beams and scanning an object for a plurality of lines simultaneously by means of the plurality of light beams in order to achieve a high image forming rate.

Conventionally, a digital copying machine provided with such a beam scanning apparatus or some other comparable optical unit is controlled for the position of exposure to a light beam in the scanning direction (light beam position control in the main scanning direction) and also for the passing position of the light beam (light beam position control in the sub scanning direction) for the purpose of forming a high quality image.

Japanese Patent Applications Nos. 09-667317 and 09-816773 propose specific position control techniques to be used for a light beam in an optical unit of the type under consideration. They utilize a pair of optical sensors arranged in juxtaposition in the scanning direction of the light beam with a predetermined gap separating them in order to detect the passing position of the light beam. Of the above identified patent documents, Japanese Patent Application No. 09-667317 describes the use of a pair of sensors provided respectively with trapezoidal or triangular patterns arranged symmetrically relative to each other. On the other hand, Japanese Patent Application No. 09-816773 describes the use of a pair of sensors provided respectively with saw-toothed patterns formed by arranging trapezoids or triangles and arranged interdigitally and symmetrically relative to each other.

According to either of the above patent documents, the paired sensors are adapted to convert the detected light beam into respective electric signals. Then, in the light beam scanning apparatus, the difference between the electric signals from the respective sensors is integrated by an integrator to detect the scanning position of the light beam. For improving the detection accuracy of such a conventional light beam scanning apparatus, the sensitivity of the sensors and the integrator needs to be improved and the amplification factor of the signal processing circuit has to be raised.

However, any effort for improving the detection accuracy of a conventional light beam scanning apparatus ends up in the fact that the output signal of the integrator becomes disproportionately large if the light beam is displaced only slightly from an intended position. Then, the output signal of the integrator can be mostly held to or near the supply voltage level or the ground level. In other words, any effort for improving the detection accuracy of a conventional light beam scanning apparatus is accompanied by the problem of very narrow detection range and/or the difficulty of adapting itself to changes with time including environmental changes.

Therefore, there is a strong demand for light beam scanning apparatus that can easily adapt themselves to changes with time and show a high detection accuracy and a wide detection range.

BRIEF SUMMARY OF THE INVENTION

In view of the above identified circumstances, it is therefore the object of the present invention to provide a light beam scanning apparatus that shows a high detection accuracy and a broad detection range.

According to the invention, the above object is achieved by providing a light beam scanning apparatus for scanning a surface to be scanned by means of a light beam, the apparatus comprising: a light emitting unit which outputs a light beam; a scanning member which causes the light beam output from the light emitting unit to scan the surface to be scanned in a main scanning direction; a light beam detecting section which has a pair of symmetrical saw-toothed patterns with a narrowed width for marginally located teeth and are formed by arranging optical elements for converting the light beam into respective electric signals, the patterns being arranged interdigitally on the surface to be scanned or at a position equivalent to the surface; a processing circuit which outputs the integral value obtained by integrating the difference of the electric signals output from the respective patterns of the light beam detecting section; and a CPU which determines the passing position of the light beam output from the light emitting unit passes on the surface to be scanned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate presently preferred embodiments of the invention, and together with the general description given above and the detailed description of the preferred embodiments given below, serve to explain the principles of the invention.

FIG. 2 is a schematic block diagram of the optical unit of the digital copying machine of FIG. 1, illustrating its configuration;

FIG. 3 is a schematic block diagram of the optical control system of the optical unit of FIG. 2;

FIG. 5 is a schematic block diagram of the processing circuit for processing the output of the light beam detecting section of FIG. 4;

FIG. 10 is a schematic block diagram of the processing circuit for processing the output of the light beam detecting section of FIG. 9;

FIG. 12 is a schematic block diagram of the processing circuit for processing the output of the light beam detecting section of the third embodiment;

FIG. 15 is a flow chart of the control routine of the processing circuit of FIG. 12 for controlling a light beam;

FIG. 16 is a schematic block diagram of the processing circuit for processing the output of the light beam detecting section of the fourth embodiment;

FIG. 22 is a schematic block diagram of the light beam detecting section and the processing circuit for processing the output of the light beam detecting section of the sixth embodiment.

DETAILED DESCRIPTION OF THE INVENTION

Now, the present invention will be described in greater detail by referring to the accompanying drawing that illustrates preferred embodiments of the invention.

Firstly, the configuration of an image forming apparatus to which the embodiments of light beam scanning apparatus according to the invention that will be described hereinafter can be applied.

Figure 1:
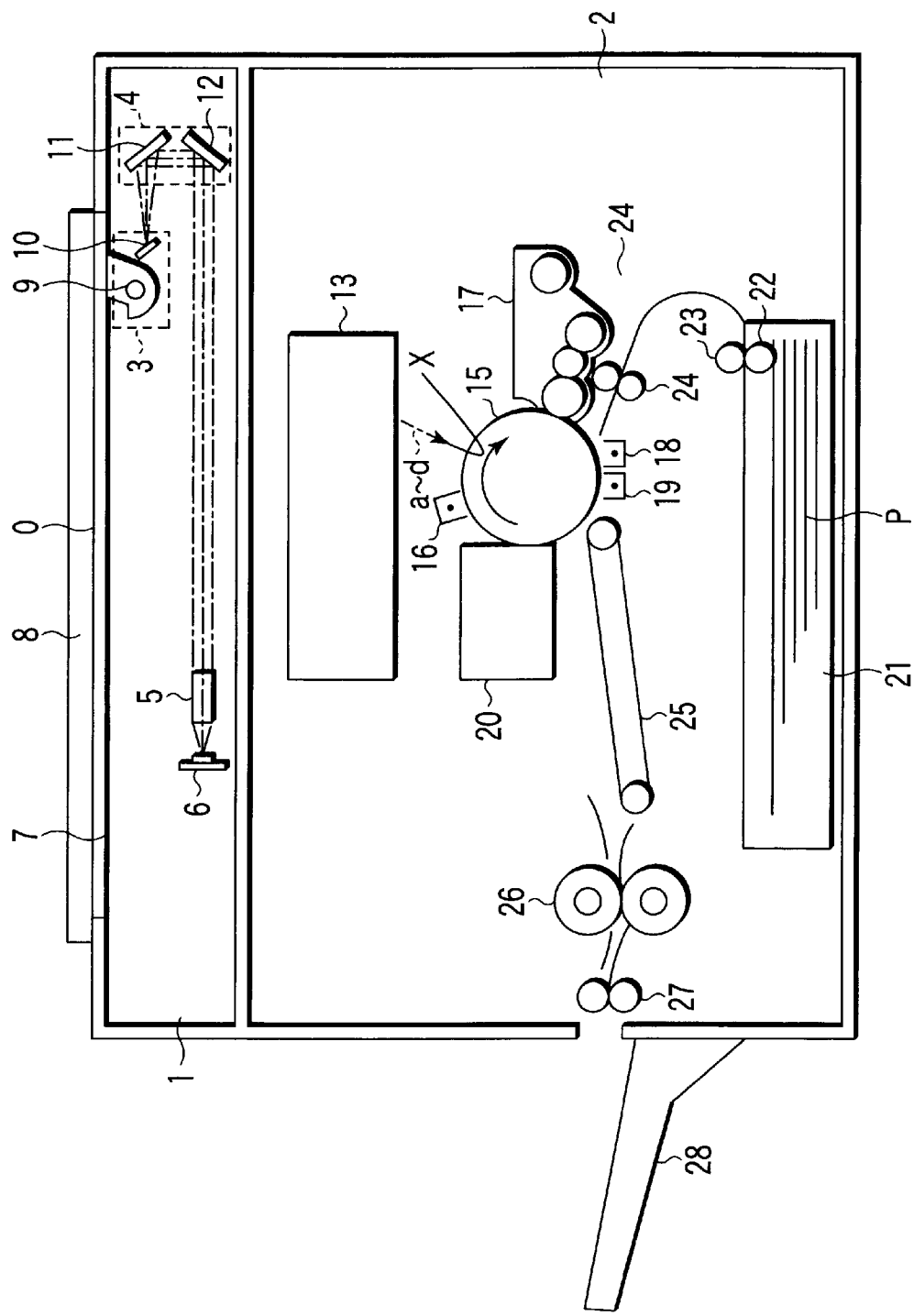
FIG. 1 is a schematic cross sectional lateral view of a digital copying machine, illustrating its configuration.

FIG. 1 is a schematic cross sectional lateral view of a digital copying machine, or an image forming apparatus, illustrating its configuration. Referring to FIG. 1, the digital copying machine comprises a scanner section 1 for reading an image of original O and a printer section 2 for forming the image on an image forming medium. The scanner section 1 by turn comprises a first carriage 3 and a second carriage 4 that can be moved in the direction of the arrow in FIG. 1, a condenser lens 5 and a photoelectric conversion element 6.

As shown in FIG. 1, the original O is placed to face downward on an original table 7 typically made of transparent glass and held in position by an original holding cover 8 that can be opened and closed relative to the original table 7.

The original O is illuminated by light emitted from light source 9 and reflected light is converged to the light receiving surface of the photoelectric conversion element 6 by way of mirrors 10, 11, 12 and the condenser lens 5. The first carriage 3 carrying the light source 9 and the mirror 10 and the second carriage 4 carrying the mirrors 11, 12 are adapted to move at relative speeds of 2:1 so that the light path length may always be held to a constant value. The first carriage 3 and the second carriage 4 are driven to move by a carriage drive motor (not shown) from right to left in FIG. 1 in synchronism with a read timing signal.

Thus, the original O put on the original table 7 is read on a scanning line by scanning line basis by the scanner section 1 and the read output is converted by an image processing section (not shown) into a digital image signal of 8 bits representing the shades of the colors of the image.

The printer section 2 comprises an optical system unit (light beam scanning apparatus) 13 and an image forming section 14 that is a combined electrophotographic system that is adapted to form an image on a sheet of paper P, or an image forming medium. Thus, the image signal representing the image read from the original O by the scanner section 1 is processed by the image processing section (not shown) and converted into a laser beam from a semiconductor laser oscillator (to be referred to simply as light beam hereinafter). A multi-beam optical system using a plurality of (e.g., four) semiconductor laser oscillators is adopted in the digital copying machine shown in FIG. 1. While only a single semiconductor laser oscillator is used in a digital copying machine adopting a single beam optical system, the configuration of such a digital copying machine is otherwise identical with that of FIG. 1.

The semiconductor laser oscillators arranged in the optical system unit 13 operate to emit respective light beams according to the laser modulation signal output from the image processing section (not shown). The light beams are reflected by a polygon mirror to produce scanning light beams, which are then output to the outside. The optical system unit 13 will be described in greater detail hereinafter.

The light beams output from the optical system unit 13 are then focused on exposure position X on the photosensitive drum 15 that operates as image carrier as spots of light showing a required degree of resolution and scan the photosensitive drum 15 in the main scanning direction (running in the direction of the axis of rotation of the photosensitive drum). As the photosensitive drum 15 is rotated, an electrostatic latent image that corresponds to the image signal is formed on the photosensitive drum 15.

The photosensitive drum 15 is surrounded by an electric charger 16 for electrically charging the surface of the photosensitive drum 15, a developing unit 17, a transfer charger 18, a stripping charger 19 and a cleaner 20. The photosensitive drum 15 is driven to rotate by a drive motor (not shown) at a predetermined peripheral speed and electrically charged by the electric charger 16 disposed vis-à-vis the surface thereof. The plurality of light beams are focused to the exposure position X to produce so many light spots arranged in the sub scanning direction on the electrically charged photosensitive drum 15.

The electrostatic latent image formed on the photosensitive drum 15 is then developed to a toner image by means of toner (developing agent) fed from the developing unit 17. The toner image formed on the photosensitive drum 15 is then transferred by the transfer charger 18 onto the sheet of paper P fed to the right position by a paper feed system at a predetermined timing.

The paper feed system is adapted to feed sheets of paper P stored in a paper feed cassette 21 arranged at the bottom thereof on a sheet by sheet basis by means of a paper feed roller 22 and a stripping roller 23. Each sheet of paper P is fed to register roller 24 and then moved to the transfer position at a predetermined timing. A sheet transport mechanism 25, a fixing unit 26 and a sheet delivery roller 27 for delivering each sheet of paper on which an image is already formed are arranged downstream relative to the transfer charger 18. Thus, each sheet of paper P onto which a toner image is transferred is made to pass through the fixing unit 26 where the toner image is fixed and then delivered into an external delivery tray 28 by way of the sheet delivery roller 27.

After the transfer of the toner image onto the sheet of paper P, the toner remaining on the surface the photosensitive drum 15 is removed by cleaner 20 to restore the initial condition of the photosensitive drum 15 and bring the latter into a standby state for the next image forming cycle.

The above cycle of operation is repeated to realize a continuous image forming operation.

As described above, the original O placed on the original table 7 is read by the scanner section 1 and the information obtained by the reading operation is processed by the printer section 2 and used to produce a toner image on the sheet of paper P.

Now, the optical system unit 13 will be described in greater detail.

FIG. 2 is a schematic block diagram of the optical unit 13 of the digital copying machine of FIG. 1, illustrating its configuration is a schematic block diagram of the optical unit of the digital copying machine of FIG. 1, illustrating its configuration. FIG. 2 illustrates the configuration of the optical system unit 13 as well as the positional relationship of the optical system unit 13 and the photosensitive drum 15. As shown in FIG. 2, the optical system unit 13 typically contains four semiconductor laser oscillators 31a, 31b, 31c, 31d. The semiconductor laser oscillators 31a, 31b, 31c, 31d are driven to simultaneously scan respecting scanning lines for forming an image. As a result, the digital copying machine can form an image at high speed without extremely raising the rpm of the polygon mirror.

More specifically, the laser oscillator 31a is driven by laser driver 32a. The light beam output from the laser oscillator 31a passes through a collimator lens (not shown) and then half mirrors 34a, 34b before it strikes polygon mirror 35, or a rotary polyhedral mirror.

The polygon mirror 35 is driven to rotate at a constant rate by a polygon motor 36 that is by turn driven by a polygon motor driver 37. As a result, the light beam reflected by the polygon mirror 35 scans the photosensitive drum at an angular velocity that is determined as a function of the rpm of the polygon motor 36 in a predetermined direction. The light beam that is made to scan the photosensitive drum by the polygon mirror 35 then passes through an f-θ lens (not shown). Then, the light beam scans the light receiving surface of light beam detecting section 38 and the surface of the photosensitive drum 15 at a predetermined constant rate due to the f-θ characteristic of the f-θ lens.

The laser oscillator 31b is driven by laser driver 32b. The light beam output from the laser oscillator 31b passes through a collimator lens (not shown) and is then reflected by a galvano-mirror 33b and then by the half mirror 34a. The light beam reflected by the half mirror 34a passes through the half mirror 34b and strikes polygon mirror 35. The route of the light beam output from the laser oscillator 31b after the polygon mirror 35 is same as those of the light beams from the laser oscillators 31a. It passes through an f-θ lens (not shown) and then scans the light receiving surface of light beam detecting section 38 and the surface of the photosensitive drum 15 at a predetermined constant rate.

The laser oscillator 31c is driven by laser driver 32c. The light beam output from the laser oscillator 31c passes through a collimator lens (not shown). It is then reflected by a galvano-mirror 33c and then passes through the half mirror 34c before it is reflected by the half mirror 34b and strikes polygon mirror 35. The route of the light beam output from the laser oscillator 31b after the polygon mirror 35 is same as those of the light beams from the laser oscillators 31a, 31b. It passes through an f-θ lens (not shown) and then scans the light receiving surface of light beam detecting section 38 and the surface of the photosensitive drum 15 at a predetermined constant rate.

The laser oscillator 31d is driven by laser driver 32d. The light beam output from the laser oscillator 31d passes through a collimator lens (not shown). It is then reflected by a galvano-mirror 33d and then by the half mirror 34c before it is reflected by the half mirror 34b and strikes polygon mirror 35. The route of the light beam output from the laser oscillator 31d after the polygon mirror 35 is same as those of the light beams from the laser oscillators 31a, 31b, 31c. It passes through an f-θ lens (not shown) and then scans the light receiving surface of light beam detecting section 38 and the surface of the photosensitive drum at 15 a predetermined constant rate.

The laser drivers 32a through 32d contain respective automatic power control (APC) circuits. The laser drivers 32a through 32d drive the respective laser oscillators 31a through 31d to emit light beams at an emission power level determined by main control section (CPU) 51, which will be described hereinafter.

The light beams output from the laser oscillators 31a, 31b, 31c, 31d are put together by the half mirrors 34a, 34b, 34c and proceed toward the polygon mirror 35.

Therefore, the four light beams can scan the surface of the photosensitive drum 15 simultaneously. Thus, it can record an image at a rate four times greater than the rate of image recording of a conventional single beam optical system unit provided that the polygon mirror 35 is driven to rotate at a same rpm.

The galvano-mirrors 33b, 33c, 33d are driven by respective galvano-mirror drive circuits 39b, 39c, 39d and regulate the positions of the respective light beams output from the laser oscillators 31b, 31c, 31d in the sub scanning direction relative to that of the light beam output from the laser oscillator 31a.

In the light beam detecting section 38, the light beam detecting section adjustment motors 38a, 38b are provided to adjust the slant of the scanning direction of the light beam and the install position.

The light beam detecting section 38 detects positions through which the four light beams pass, the timings at which they pass and their power levels (and hence the quantities of light) respectively. The light beam detecting section 38 is arranged near an end of the photosensitive drum 15 and its light receiving surface is equivalent to that of the photosensitive drum 15. The galvano-mirrors 33b, 33c, 33d (the image forming positions in the sub scanning direction) and the emission power levels and the timings of emission of the laser oscillators 31a, 31b, 31c, 31d (the image forming positions in the main scanning direction) are controlled for the respective light beams on the basis of the detection signals from the light beam detecting section 38. The light beam detecting section 38 is connected to a light beam detecting section output processing circuit (processing circuit) 40 in order to generate signals to be used for the above control operations.

Now, the control system of the digital copying machine of FIG. 1 will be discussed below.

FIG. 3 is a schematic block diagram of the optical control system of the optical unit of FIG. 2 having a multi-beam optical system. Referring to FIG. 3, there is shown a main control section 51, or a CPU, for controlling the overall operation. The control section 51 is connected to a memory 52, a control panel 53, an external communication interface (I/F) 54, the laser drivers 32a, 32b, 32c, 32d, the polygon mirror driver 37, the galvano-mirror drive circuits 39b, 39c, 39d, the light beam detecting section output processing circuit 40, a synchronizing circuit 55 and an image data interface (I/F) 56.

The synchronizing circuit 55 is connected to the image data I/F 56, which image data I/F 56 is by turn connected to an image processing section 57 and a page memory 58. The image processing section 57 is connected to the scanner section 1 while the page memory 58 is connected to an external interface (I/F) 59.

The image data to be used for forming an image flow in a manner as briefly described below.

In an operation of copying an image, the image of the original O placed on the original table 7 is read by the scanner section 1 and sent to the image processing section 57. The image processing section 57 performs certain known processing operations including shading correction, various filtering operations, gradation processing and gamma correction on the image signal from the scanner section 1.

The image data from the image processing section 57 are then sent to the image data I/F 56. The image data I/F 56 allocates the image data to the four laser drivers 32a, 32b, 32c, 32d.

The synchronizing circuit 55 generates a clock in synchronism with the timing of each light beam passing over the light beam detecting section 38. Then, the image data are transmitted as laser modulation signals from the image data I/F 56 to the laser drivers 32a, 32b, 32c, 32d in synchronism with the respective clocks.

The synchronizing circuit 55 comprises a sample timer for forcibly driving the laser oscillators 31a, 31b, 31c, 31d to emit light beams in a non-image region and controlling the power levels of the respective light beams and a logic circuit for driving the laser oscillators 31a, 31b, 31c, 31d to emit light beams so as to scan the light beam detecting section 38 and detect the positions of the respective light beams in the main scanning direction.

In this way the image data are transferred in synchronism with the scanning operations of the light beams to form an image in a synchronized manner in terms of the main scanning direction (at a right position).

The control panel 53 is a machine interface for starting an copying operation and specifying the number of copies to be printed.

The digital copying machine is adapted not only to copy an image but also to form an image on the basis of the image data input externally by way of the external I/F 59 connected to the page memory 58. The image data input from the external I/F 59 are temporarily stored in the page memory 58 and subsequently sent to the synchronizing circuit 55 by way of the image data I/F 56.

When the digital copying machine is controlled externally by way of a network, the external communication I/F 54 takes the role of the control panel 53.

The galvano-mirror drive circuits 39b, 39c, 39d drive the respective galvano-mirrors 33b, 33c, 33d according to the specified values sent from the main control section 51. Thus, the main control section 51 can control the angles of the galvano-mirrors 33b, 33c, 33d by way of the respective galvano-mirror drive circuits 39b, 39c, 39d without restrictions.

The polygon motor driver 37 drives the polygon motor 36 and rotate the polygon mirror 35 in order to cause the four light beams to scan. The main control section 51 can start and stop the rotary motion of the polygon mirror 35 and shift the rpm of the polygon mirror 35 by way of the polygon motor driver 37. The polygon motor 36 is operated to drive the polygon mirror 35 with a rpm lower than the one to be used for forming an image when ensuring the positions through which the light beams pass by means of the light beam detecting section 38.

As pointed out earlier, the laser drivers 32a, 32b, 32c, 32d have a function of forcibly driving the laser oscillators 31a, 31b, 31c, 31d to emit light beams by means of forced emission signals from the main control section 51 independently from the image data in addition to the function of driving the laser oscillators 31a, 31b, 31c, 31d to emit light beams according to the image data given to them.

The main control section 51 specifies the power levels of the light beams that the laser oscillators 31a, 31b, 31c, 31d emit respectively by means of the laser drivers 32a, 32b, 32c, 32d. The specified power levels may be modified appropriately according to the changes in the process conditions, the detected positions through which the light beams respectively pass and so on.

The memory 52 is used to store information necessary for controlling the operation of the digital copying machine. For examples, it stores quantities to be used for controlling the galvano-mirrors 33b, 33c, 33d, characteristic values of circuits for detecting positions through which the light beams respectively pass (offset values of the amplifier) and the sequence according to which the light beams arrive in order to make the optical system unit 13 ready for an image forming operation immediately after the power source is turned on.

Now, different possible configurations of optical system unit (light beam scanning apparatus) 13 that can be used in a digital copying machine as shown in FIGS. 1, 2 and 3 will be described below as Embodiments 1 through 6.

Firstly, the first embodiment will be described.

Figure 4:
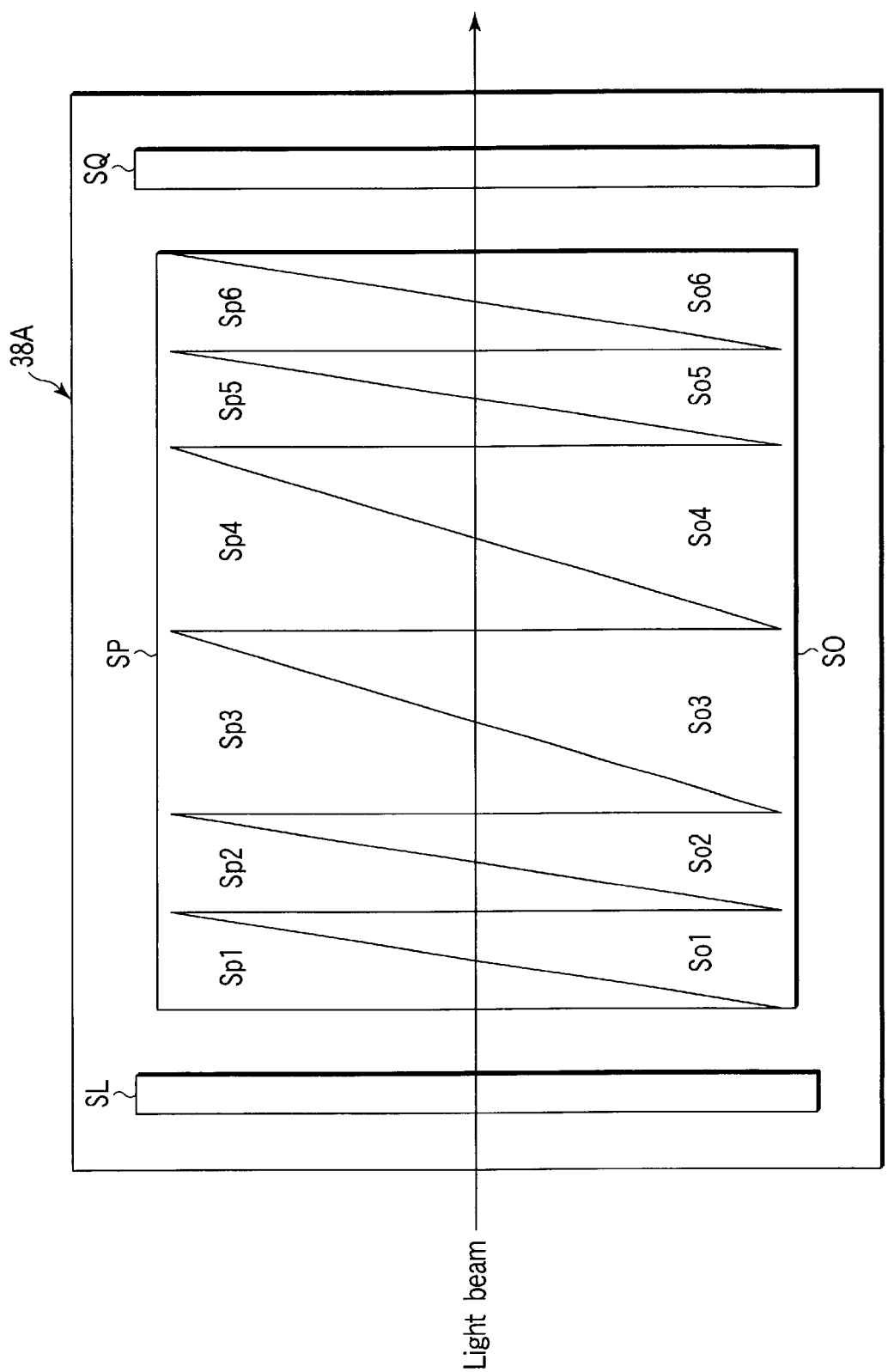
FIG. 4 is a schematic illustration of the light beam detecting section of the first embodiment of the invention.

This first embodiment of light beam scanning apparatus 13 is adapted to a single light beam optical system that uses a single light beam for scanning a photosensitive drum 15 for exposure. FIG. 4 is a schematic illustration of the light beam detecting section 38A of the first embodiment of light beam scanning apparatus 13.

As shown in FIG. 4, the light beam detecting section 38A comprises sensor SL, sensor SQ, sensor SP and sensor SO. These sensors are formed by using photo detecting members such as photodiodes that are arranged integrally on a holding substrate. The sensor SP and the sensor SO form a pair and arranged interdigitally in the scanning direction of the light beams with the respective saw-toothed profiles separated from each other by a minute gap of about 10 $\mu$m. As pointed out above, the sensors SP and SO show a saw-toothed pattern with a narrowed width for marginally located teeth including the most upstream ones and the most downstream ones when viewed in the main scanning direction.

The sensors SL and SQ are adapted to detect signals to be used for integrating the sensor output (differential output). The sensor SL generates a reset end signal (or an integration start signal) of the integrator. The sensor SQ generates a conversion start signal for A/D conversion of the integral output.

The sensor SP is a photodiode having a saw-toothed profile formed by a plurality of sensor patterns SP1 through SP6. The sensor SO is a photodiode having a saw-toothed profile matching the sensor SP and formed also by a plurality of sensor patterns SO1 through SO6. More specifically, the sensor patterns SP1, SP2, SP5 and SP6 of the sensor SP have a width smaller than that of each of the sensor patterns SP3 and SP4 as viewed in the main scanning direction. In the instance of FIG. 4, the width of each of the sensor patterns SP1, SP2, SP5 and SP6 is ½ of that of the sensor pattern SP3 or SP4 in the main scanning direction. Similarly, the sensor patterns SO, SO2, SO5 and SO6 of the sensor SO have a width smaller than that of each of the sensor patterns SO3 and SO4 as viewed in the main scanning direction.

The sensor patterns SP1 through SP6 of the sensor SP and the sensor patterns SO1 through SO6 of the sensor SO may alternatively be made to be so many sensors comprising respective photodiodes. The net effect will be same as the above described sensors.

The light beam detecting section 38A is arranged in a manner as illustrated in FIG. 4 relative to the scanning direction of the light beams. Thus, as a light beam passes through the sensors SP and SO (from left to right in FIG. 4), it is detected sequentially by the sensor patterns SP1, SO1, SP2, SO2, SP3, SO3, SP4, SO4, SP5, SO5, SP6 and SO6 in the above listed order. Each of the sensors SP and SO outputs a detection output that reflects the distance by which the light beam travels through it.

In the case of the light beam detecting section 38A illustrated in FIG. 4, the distance by which the light beam travels through the sensor SP becomes long as the light beam is moved upward along the main scanning direction, whereas the distance by which the light beam travels through the sensor SO becomes short. On the other hand, the distance by which the light beam travels through the sensor SO is increased as the light beam is moved downward along the main scanning direction, whereas the distance by which the light beam travels through the sensor SP is reduced. In other words, as the light beam changes its position of passing through the sensors in a direction (sub scanning direction) perpendicular to the main scanning direction, the detection output of either of the sensors, sensor SP or SO, continuously increases whereas the detection output of the other sensor, sensor SO or sensor SP whichever appropriate, continuously decreases.

FIG. 5 is a schematic block diagram of the light beam detection output processing circuit (processing circuit) 40A for processing the output of the light beam detecting section 38A of FIG. 4. The processing circuit 40A is adapted to detect the scanning position of each light beam in a direction (sub scanning direction) perpendicular to the main scanning direction.

Referring to FIG. 5, the processing circuit 40A computes the difference of the detection output of the sensor pattern SP1 through SP6 of the sensor SP and the detection output of the sensor patterns SO1 through SO6 of the sensor SO, by a differential amplifier 61. In the processing circuit 40A, the difference of the outputs of the differential amplifier 61 is integrated by the integrator 62. The value integrated by the integrator 62 becomes the information which indicates the position of the light beam.

Now, the circuit configuration of the processing circuit 40A will be described in detail. Assume here that the processing circuit 40A is adapted to detect a single light beam.

Each of the sensor patterns SP1 through SP6 of the sensor SP and the sensor patterns SO1 through SO6 of the sensor SO outputs an electric current when a light beam passes through it. The sensor SP and the sensor SO are connected to respective current/voltage conversion amplifiers IV1, IV2. Thus, the current outputs of the sensors SP, SO are converted into voltage outputs by the respective current/voltage conversion amplifiers IV1, IV2.

The output terminals of the current/voltage conversion amplifiers (IV1, IV2) are connected to a differential amplifier 61, which computes the difference of the outputs of the current/voltage conversion amplifier (IV1, IV2) and amplifies it with an appropriate gain. The output of the differential amplifier 61 is then integrated by integrator 62.

The integrator 62 accumulates electric charge in its capacitor and outputs them as integral output. In other words, it is necessary to discharge the electric charge accumulated in the capacitor before using the integrator 62 (this operation will be referred to as reset hereinafter).

The integrator 62 is reset by a reset signal that is generated by combining the outputs of the sensors of the light beam detecting section 38. More specifically, the reset signal is generated by reset signal generating circuit 63, using the outputs of the sensor SA (not shown) and the sensor SL.

As a light beam passes, the sensors SA, SL output respective output signals and the integrator 62 is reset between the output signal of the sensor SA and that of the sensor SL. Then, immediately after the reset, a light beam detection signal is output from each of the sensors SP and SO and integrated by the integrator 62.

The output signal of the integrator 62 is input to window comparators (CMP1, CMP2) adapted to convert an analog signal into a digital signal. More specifically, the window comparators convert the output signal (analog voltage) of the integrator 62 into digital signals. A threshold value to be used for converting an analog signal into a digital signal is selected for each of the window comparators (CMP1, CMP2) by the main control section (CPU) 51 by way of a D/A converter (D/A1 or D/A2).

The output signals of the window comparators (CMP1, CMP2) are input to respective flip-flop circuits (F/F1, F/F2) and held there. The pulse-shaped signal output from the sensor SQ is also input to the flip-flop circuits (F/F1, F/F2). The flip-flop circuits (F/F1, F/F2) are adapted to hold the output signals of the window comparators (CMP1, CMP2) at the output timing (the rising edge of the pulse signal) of the sensor SQ.

The output signals of the flip-flop circuits (F/F1, F/F2) are sent to the CPU 51. The CPU 51 also receives the output signal of timing sensor SR (not shown) in the light beam detecting section 38 as interrupt signal. Thus, each time the timing sensor SR produces an output signal (which is received by the CPU 51 as interrupt signal), the CPU 51 reads the data of the flip-flop circuits (F/F1, F/F2).

Now, the window comparators (CMP1, CMP2) will be described in detail. Referring to FIG. 5, the output signal of the integrator 62 is for example fed to the inverting input of the comparator CMP1 and the non-inverting input of the comparator CMP2. The output Vth1 of one of the D/A converters (D/A1) is connected to the non-inverting input of the comparator CMP1, whereas the output Vth2 of the other D/A converter (D/A2) is connected to the inverting input of the comparator CMP2.

The CPU 51 supplies the threshold values Vth1, Vth2 to the window comparators CMP1, CMP2 by way of the D/A converters (D/A2). Both of the comparators CMP1, CMP2 output "1" only when the output voltage of the integrator 62 is smaller than the threshold value Vth1 and greater than the threshold value Vth2. When the output signals of the window comparators CMP1, CMP2 and hence those of the flip-flop circuits (F/F1, F/F2) are "1, 1", the CPU 51 judges that the output signal of the integrator 62 is found within the window of the threshold values Vth1 and Vth2. The CPU 51 can accurately determine the output voltage of the integrator 62 and hence the information on the position through which the light beam passes by gradually narrowing the width of the window and shifting the position thereof. Then, the main control section 51 controls the position through which the light beam passes by using the light path shifting means such as galvano-mirrors on the basis of the obtained information on the position through which the light beam passes.

While not shown in FIG. 5, signal processing circuits such as current/voltage conversion amplifiers for converting the output currents of the respective sensors into voltage values and binarization circuits for binarizing the output signals of the current/voltage conversion amplifiers are provided.

Now, the operation of the processing circuit 40 when a light beam passes through the light beam detecting section 38A will be discussed in detail.

The light beam is made to scan in the direction indicated by an arrow by the polygon mirror 35. As the light beam passes, each of the sensors SL, SP, SO, SQ generates an electric current. The electric current output from the sensor SL is converted into a voltage value by the corresponding current/voltage conversion amplifier (not shown) and binarized by the corresponding binarization circuit (not shown). The binarized signal is input to the reset signal generating circuit 63. The reset signal generating circuit 63 generates a reset sit by synthetically combining the binarized signal and the output signal of the sensor SA (not shown). The reset signal is input to the integrator 62 to reset the latter. The reset signal also operates as clear signal for clearing the flip-flop circuits F/F1, F/F2.

As the light beam passes through the sensors SP and SO, the sensors output respective pulse-shaped electric currents that can vary depending on the position through which the light beam passes. The output currents are then converted into voltage values by the respective current/voltage conversion amplifiers (IV1, IV2). The difference of the signals obtained by the current/voltage conversion is amplified by the differential amplifier 61 and integrated by the integrator 62. The output of the integrator 62 is input to the window comparators CMP1, CMP2 operating as analog/digital converters and compared with threshold values selected by way of the D/A converters (D/A1, D/A2) and converted into a digital signal.

Additionally, as the light beam passes through the sensor SQ, the output current of the sensor SQ is also converted into a voltage value by the corresponding current/voltage conversion amplifier (not shown). The obtained voltage value is binarized by a binarization circuit. The binarized signal is then input to the flip-flop circuits F/F1, F/F2. The output signals of the window comparators CMP1, CMP2 are held by the respective flip-flop circuits F/F1, F/F2 at the timing of the rising edge of the binarized signal.

The output signal of the sensor SR (not shown) is input to the main control section 51 as interrupt signal. The main control section 51 reads the output signals of the window comparators CMP1, CMP2 and hence those of the flip-flop circuits F/F1, F/F2 by using the signal.

Now, the difference between the light beam detecting section 38 having the above described configuration and conventional light beam detecting sections will be discussed below.

Figure 6:
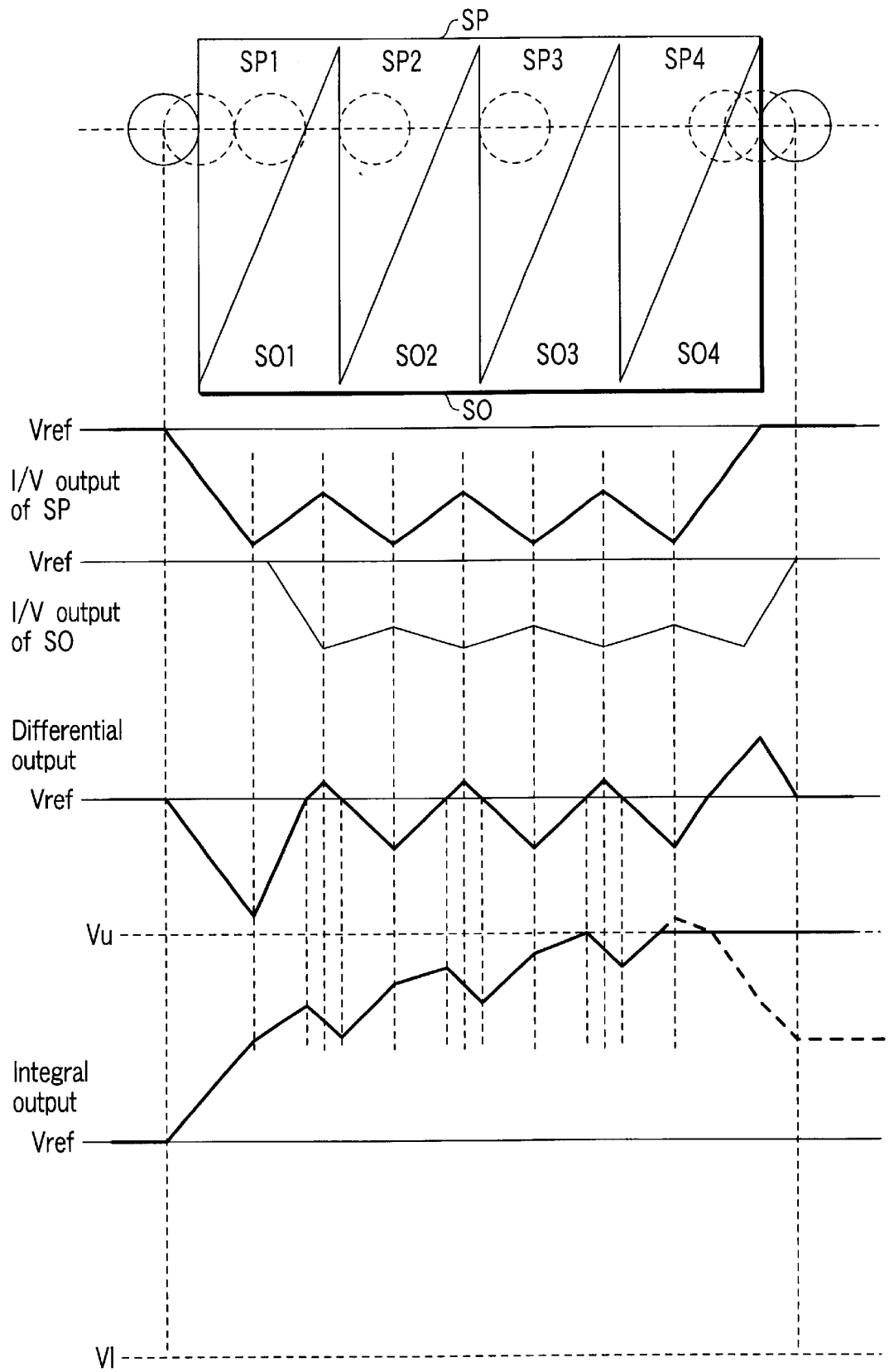
FIG. 6 is a graph schematically illustrating the outputs of the sensors, the differential amplifier and the integrator for a light beam.

The light beam detecting section 38 of the first embodiment differs from conventional light beam detecting sections in that the marginally located saw-toothed sensor patterns (photodiode) including the most upstream teeth and the most downstream teeth are narrowed as viewed in the main scanning direction. The corresponding sensors of conventional light beam detecting sections are realized by combining monotonous and uniform patterns as shown in FIG. 6. Contrary to the profile of the sensors of conventional light beam detecting sections, that of the sensors SP and SO of the light beam detecting section of the embodiment shown in FIG. 4 is such that the most upstream sensor patterns SP1 and SP2 are formed by diving an ordinary sensor pattern and the most upstream sensor patterns SO1 and SO2 are also formed by dividing an ordinary sensor pattern as viewed in the main scanning direction. So are the most downstream sensor patterns SP5 and SP6 and SO5 and SO6. Theoretically, the narrower the most upstream and downstream sensor patterns of the sensors SP and SO, the better the effect of the embodiment.

Referring to FIG. 6 showing a conventional light beam detecting section, the light beam is detected sequentially by the sensor patterns SP1, SO2, SP2, . . . The output value (differential output) of the differential amplifier fluctuates in a manner as shown in FIG. 6 according to the detecting operations of the sensor patterns. In the case of FIG. 6, the output value (integral output) of the integrator is ultimately saturated. In other words, the integral output does not reflect the right position of the light beam. In FIG. 6, the broken line shows the right value of the integral output and hence the right position of the light beam.

Thus, by paying attention to the ultimately saturated situation of the integral output as shown in FIG. 6, it will be appreciated that the amplitude of the differential output obtained from the detection output of the most upstream sensor pattern is greater than that of any other differential output. This is because the paired saw-toothed sensors SP, SO are used and hence the output of the SP1 and that of the SO1 show a phase difference. The large amplitude of the most upstream sensor patterns is the most significant cause of the saturation of the integral output.

In the instance of FIG. 6, the integral output should show a profile indicated by the broken line but in reality the output exceeding Vu is held flat to the supply voltage (saturated) and does no longer vary to produce the profile indicated by the solid line. In FIG. 6, Vu is the maximum positive voltage (e.g., the supply voltage that may typically be +5V) and Vl is the maximum negative voltage (e.g., the ground level bv).

In the instance of FIG. 6, when the integral output exceeds the level of Vu, it signifies that the integral output that should indicate the position through which the light beam passes does not change from a position located close to the sensor SP and hence the sensor SP can no longer detect the position. So is the sensor SO. When the integral output exceeds the level of Vl (0V or less), it signifies that the integral output that should indicate the position through which the light beam passes is held flat to the ground level and does not vary and hence the sensor SO can no longer detect the position.

This problem can be dissolved to some extent by modifying the integration constant of the integrator 62 so that the integral output may not held to the supply voltage level or the ground level within the effective detection zone of the light beam detecting section. However, the detection accuracy (resolving power) of the light beam detecting section falls as the integration constant is modified to make the entire effective detection zone to be contained between Vl and Vu.

For example, if the effective detection zone of the sensors is 100 μm in a 0 to +5V system, the resolution will be 500 [mV]/100 [μm]=50 [mV/μm]. Therefore, for the effective detection zone of 100 μm, a resolution of about 1 μm can be achieved by using A/D converters showing a resolving power of about 8 bits for the processing circuit.

On the other hand, if the effective detection zone of the sensors is 2,000 μm in a 0 to +5V system, the resolution will be 5,000 [mV]/2,000 [μm]=2.5 [mV/μm]. Therefore, for the effective detection zone of 2,000 μm, A/D converters showing a high resolving power of at least 12 bits need to be used for the processing circuit. A/D converters showing such a high resolving power are very expensive. Additionally, other circuit elements should match the high resolving power. Circuit elements matching such a high resolving power are also very expensive. Still additionally, there arises a problem that the entire processing circuit should suppress the noise level to less than 2.5 mV.

The first embodiment is designed to reduce the problems of conventional light beam detecting sections 38 and highly accurately detect the position through which the light beam passes in a wide area.

When the integral output of a conventional light beam detecting section is saturated, it is mainly because of the large amplitude of the most upstream differential output as shown in FIG. 6. This means that the saturation of the integral output can possibly be suppressed by reducing the detection output of the sensor pattern SP1 that firstly detects the light beam. The detection output of each sensor pattern increases as a function of the distance by which the light beam travels through it. Therefore, the detection output of the most upstream sensor pattern SP1 can be reduced by reducing the width of the sensor pattern SP1 in terms of the main scanning direction.

Thus, unlike conventional sensor patterns, the sensors SP and SO of this embodiment are made to show a saw-toothed pattern with a narrowed width for marginally located teeth including the most upstream ones and the most downstream ones when viewed in the main scanning direction as shown in FIG. 4.

Figure 7:
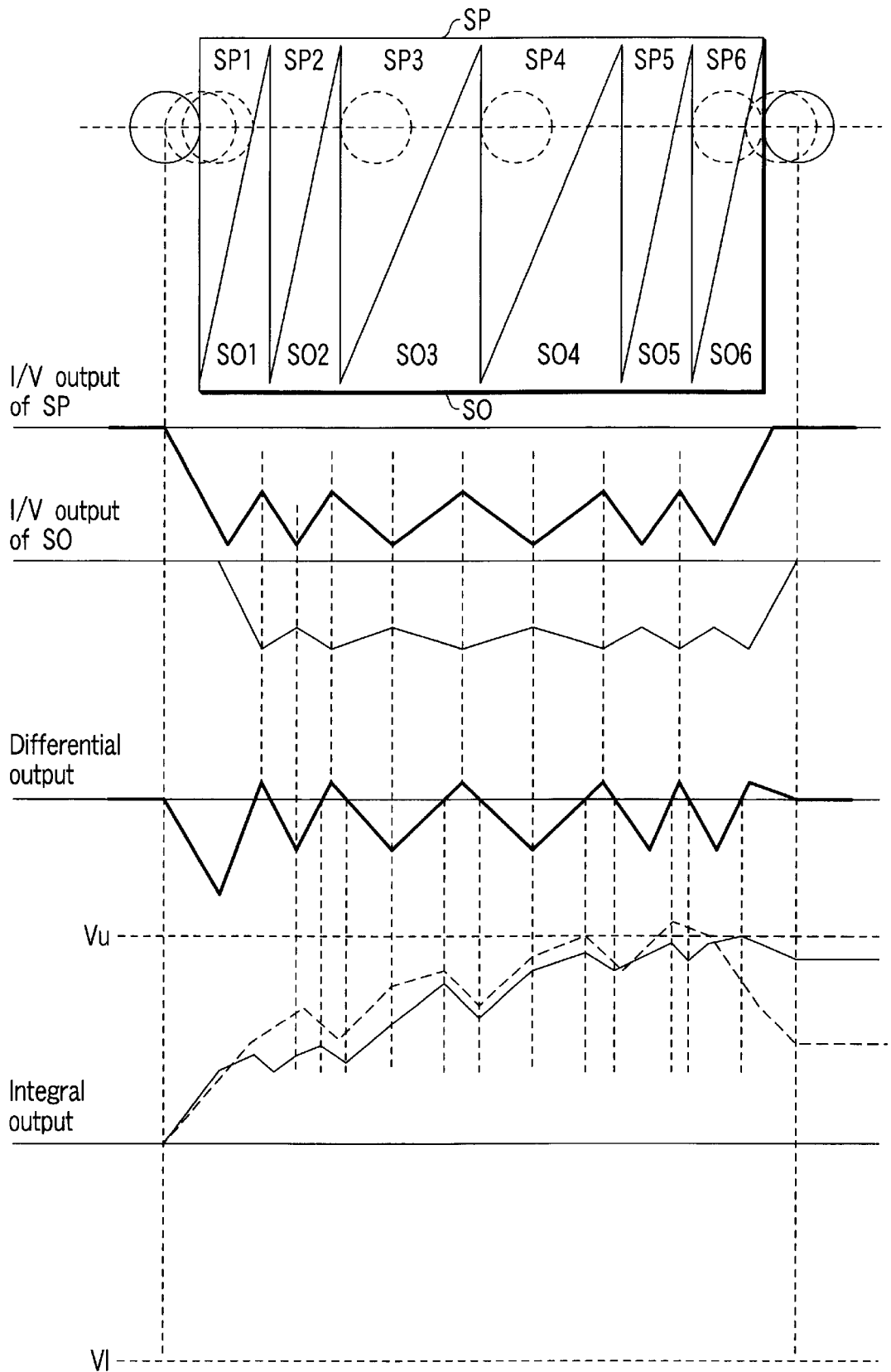
FIG. 7 is a graph schematically illustrating the outputs of the sensors, the differential amplifier and the integrator of the light beam detecting section of FIG. 4.

FIG. 7 is a graph schematically illustrating the outputs of the current/voltage converters (I/V outputs), the output of the differential amplifier (differential output) and that of the integrator (integral output) of the light beam detecting section 38A of FIG. 4. The I/V outputs of the sensors SP and SO are as shown in FIG. 7 when a light beam passes through the positions indicated in an upper part of FIG. 7.

As pointed out above, the sensor patterns SP1, SP2, SO1, SO2 have a width smaller than their counterparts of the conventional light beam detecting section shown in FIG. 6 as viewed in the main scanning direction. Therefore, (the widths of) the I/V outputs that corresponds to the detection outputs of the sensor patterns SP1, SP2, SO1, SO2 are also reduced.

As a result, the large amplitude of the output of the differential amplifier at the most upstream position is reduced as shown in FIG. 7. Thus, the integral output of the integrator is not held flat to the supply voltage as shown by the solid line in FIG. 7 and hence the position through which the light beam passes can be detected accurately. While the most upstream sensor pattern of the sensor SP and that of the sensor SO are made to show a width equal to a half of the ordinary sensor patterns in this embodiment, the effect of this invention will become more remarkable when they are made to show a smaller width.

It will be appreciated that, in the light beam detecting section 38A shown in FIGS. 4 and 7, the most downstream sensor patterns SP5, SP6, SO5, SO6 are also made to show a width equal to a half of the ordinary sensor patterns. This arrangement provides the effect of providing a negative integrated voltage. In other words, when the light beam scans a position close to the sensor SO, the above described arrangement provides the effect of suppressing the phenomenon that the integral output is held flat to the ground level to narrow the effective beam detection zone. Thus, like the most upstream sensor patterns, the most downstream sensor patterns can remarkably suppress the phenomenon that the integral output is held flat to the ground level when they are made narrow (as viewed in the main scanning direction).

Figure 8:
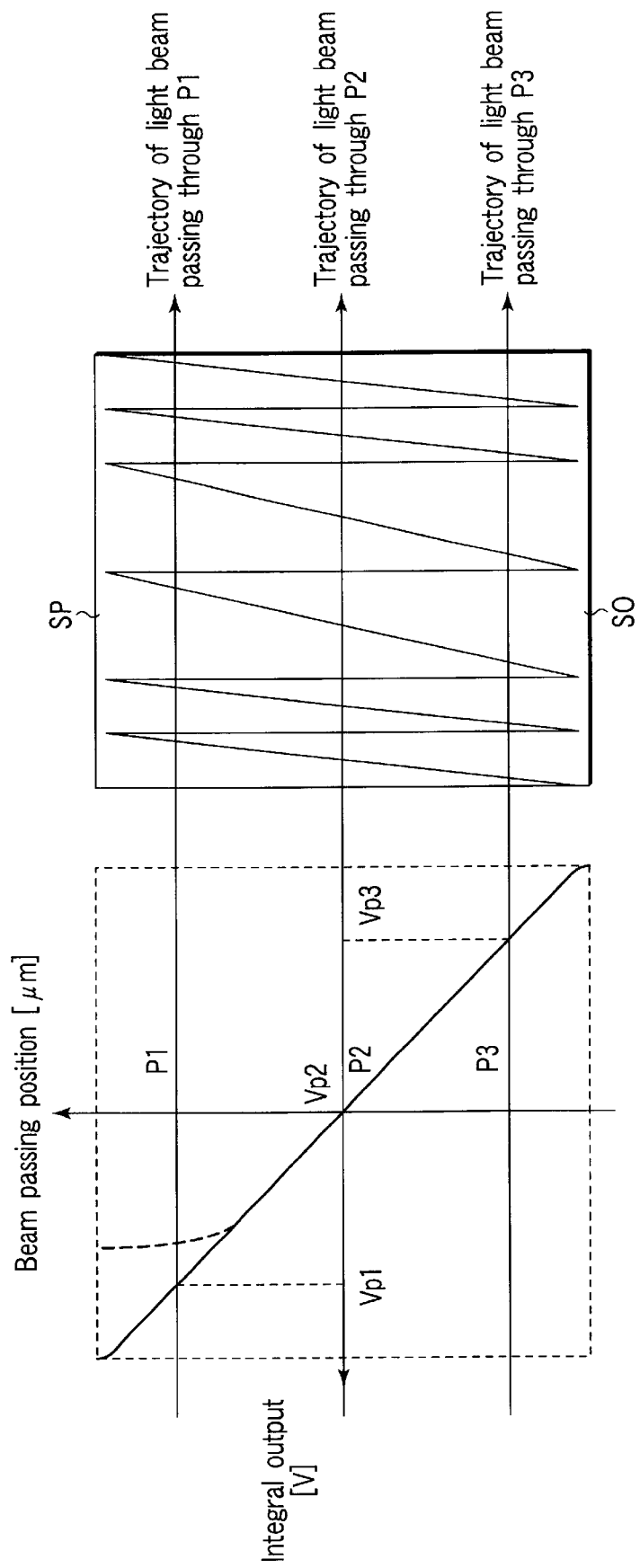
FIG. 8 is a graph schematically illustrating the output of the integrator for a position through which a light beam passes.

FIG. 8 is a graph schematically illustrating the relationship between the position through which the light beam passes and the integral output. As the light beam passes through point P1 in the sensors SP and SO, the integrator 62 produces output Vp1. When the light beam passes through the middle (P2) of the sensors, the integrator 62 produces output Vp2 (Vref). When the light beam passes through point P3 in the sensors SP and SO, the integrator 62 produces output Vp3.

As seen from FIG. 8, when the light beam travels by a longer distance through the sensor SP than through the middle of the sensors SP and SO, a positive integral output is produced relative to Vref. When, on the other hand, the light beam travels through the sensor SO by a longer distance than through the middle of the sensors SP and SO, a negative integral output is produced relative to Vref. Thus, the position through which the light beam passes can be confirmed by monitoring the integral output. Additionally, the position through which the light beam passes can be controlled in a desired way by arranging light path modifying members such as galvano-mirrors.

As described above, in the first embodiment, sensors having a saw-toothed profile where the most upstream side sensor patterns are made to show a reduced width are used to accurately detect the position of the light beam in the sub scanning direction. As a result, a highly accurate light beam scanning apparatus having a detection zone much wider than that of any conventional light beam scanning apparatus is realized without raising the cost of the elements of the entire circuit.

Now, the second embodiment of the invention will be described.

The second embodiment is a multi-beam type light beam scanning apparatus realized by applying the light beam detecting section 38A of the first embodiment. One of a plurality of light beams is fixed in this light beam scanning apparatus. Galvano-mirrors are provided to modify the positions through which the other light beams pass respectively. Thus, the position through which the fixed light beam passes is observed and the galvano-mirrors (relative position controlling means for light beams) are so controlled that the pitch of arrangement of the remaining light beams shows a desired value.

Figure 9:
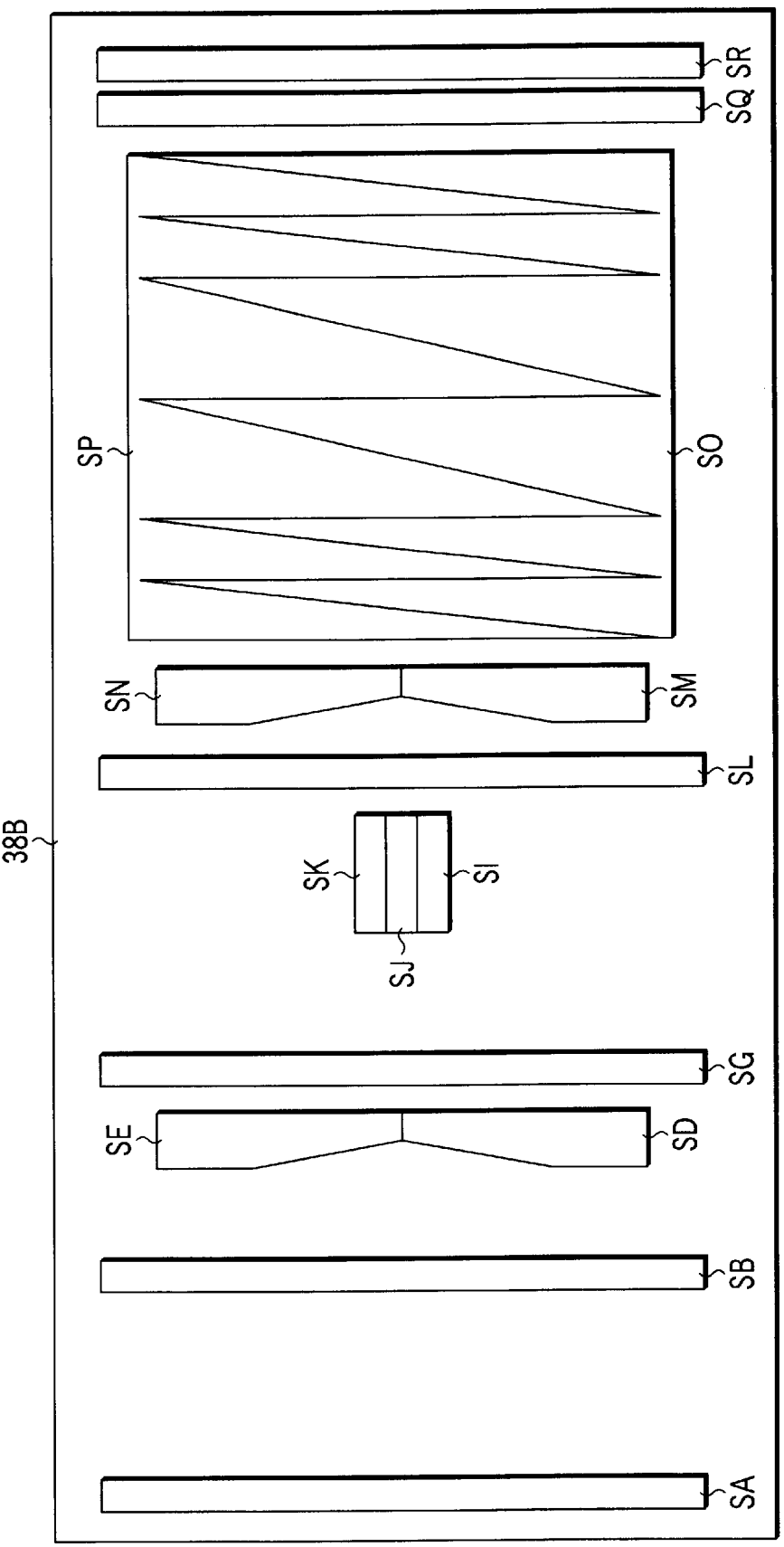
FIG. 9 is a schematic illustration of the light beam detecting section of the second embodiment of the invention.

FIG. 9 is a schematic illustration of the light beam detecting section 38B of the second embodiment of the invention. As shown in FIG. 9, the light beam detecting section 38B comprises sensors SA, SB, SD, SE, SG, SI, SJ, SK, SL, SM, SN, SP, SO, SQ, SR that are provided for the light beams adapted to scan in the main scanning direction.

The sensors SA through SR are formed by using photodiodes. Of the sensors, the sensors SI, SJ, SK are for a reference pitch. More specifically, they are arranged in the sub scanning direction with minute gaps separating them at a pitch equal to integer times of the resolution. For example, if the resolution is 600 dpi, they are arranged at a pitch of 25.4 [mm]/600 ×n.

The sensors SP, SO are same as those of the light beam detecting section 38A of the first embodiment. More specifically, the sensors SP and SO of this embodiment are made to show a saw-toothed pattern with a narrowed width for marginally located teeth including the most upstream ones and the most downstream ones when viewed in the main scanning direction.

With the second embodiment, the reference pitches of the positions through which the light beam passes is observed by means of the sensors, SI, SJ, SK and the outputs of the sensors SP and SO are normalized by using the obtained values to determine the positions through which the fixed light beam and the movable light beams pass respectively.

The sensors SA, SB, SG, SL, SQ, SR are timing sensors and adapted to output timing signals when a light beam passes through them. The sensor output processing circuit 40B, which will be described in greater detail hereinafter, operates in a predetermined manner in response to the outputs of the timing sensors. The sensors SD, SE, SM, SN are tilt detection sensors and operate to detect the extent of parallelism between the main scanning direction of the light beams and the sensor SP and SO.

FIG. 10 is a schematic block diagram of the processing circuit 40B for processing the output of the light beam detecting section 38B of FIG. 9. As shown in FIG. 10, the output signals of the sensors SP and SO of the light beam detecting section 38B are applied to the respective input terminals of differential amplifier 70. The output signals of the sensors SI and SJ are applied to the respective input terminals of differential amplifier 71. The output signals of the sensors SJ and SK are applied to the respective input terminals of differential amplifier 72. The main control section (CPU) 51 can specify the amplification factor of each of the differential amplifiers 70, 71, 72.

The output signals of the differential amplifiers 70, 71, 72 are sent to selection circuit (analog switch) 73. The selection circuit 73 selects one of the output signals that is to be input to the integrator 74 according to the sensor selection signal from the main control section 51. The signal selected by the selection circuit 73 is input to the integrator 74 for integration.

The output signal of the integrator 74 is input to window comparator 75. The window comparator 75 converts the integral output (analog signal) of the integrator 74 into a digital signal. A threshold value is set in the window comparator 75 by the main control section 51 by way of D/A converter 76. Note that the D/A converter 76 actually comprises two D/A converters (D/A1, D/A2).

The output of the window comparator 75 is sent to flip-flop circuit (F/F) 77. The flip-flop circuit (F/F) 77 holds the output of the window comparator 75. The output of the flip-flop circuit (F/F) 77 is sent to the main control section 51.

The output signal of the sensor SA is sent to the flip-flop circuit 77 as clear signal. The output signals of the sensors SA, SH, SL are sent to reset signal generating circuit 78. The reset signal generating circuit 78 generates a reset signal from the output signals of the sensors SA, SH, SL according to the selection signal from the main control section 51 to reset the integrator 74. The integrator 74 starts an integrating operation after it is reset by the reset signal.

The output signals of the sensors SL, SQ are sent to conversion start signal circuit 79. The conversion start signal circuit 79 selects either of the output signals of the sensors SL and SQ according to the selection signal from the main control section 51 and sends the selected signal to the flip-flop circuit 77 as conversions start signal. The output signal of the sensor SR is sent to the main control section 51 as interrupt signal.

Upon receiving the interrupt signal from the sensor SR, the main control section 51 reads the output of the flip-flop circuit 77 to obtain the most updated information on the positions passed by the light beams. The main control section 51 computes the values necessary for controlling the galvano-mirrors 33b, 33c, 33d on the basis of the invention obtained for the positions through which the light beams pass. Then, it stores the outcome of the computations in the memory 52 and, at the same time, sends it to the galvano-mirror drive circuits 39b, 39c, 39d.

The galvano-mirror drive circuits 39b, 39c, 39d are provided with respective latches 44b, 44c, 44d for holding the output of the computations. The latches 44b, 44c, 44d hold the data written by the main control section 51 until they are updated.

The data held by the latches 44b, 44c, 44d are converted into analog signals (voltages) respectively by the D/A converters 45b, 45c, 45d, which analog signals are then applied to respective drivers 46b, 46c, 46d for driving the galvano-mirrors 33b, 33c, 33d respectively. The drivers 46b, 46c, 46d drive and control the respective galvano-mirrors 33b, 33c, 33d according to the analog signals (voltages) applied to them from the D/A converters 45b, 45c, 45d.

Therefore, with this second embodiment, it is possible to control the positions through which the light beams pass by driving the semiconductor laser oscillators to emit laser beams to be controlled, reading the output of the window comparator 75 and controlling the galvano-mirrors 33b, 33c, 33d according to the obtained information.

While not shown in FIG. 10, signal processing circuits such as current/voltage conversion amplifiers for converting the output currents of the respective sensors into voltage values and binarization circuits for binarizing the output signals of the current/voltage conversion amplifiers are provided.

For the operation of detecting and controlling the positions through which the light beams pass by using the sensors SP and SO and the processing circuit 40B, the main control section 51 sends a selection signal for selecting the differential amplifier 70 to the selection circuit 73. Then, the main control circuit 51 selects the sensors SP and SO. Similarly, the main control section 51 sends a sensor selection signal to the reset signal generating circuit 78 and the conversion start signal circuit 79. By sending the sensor selection signal, the main control section 51 causes a reset signal for resetting the integrator 74 and a digital/analog conversion start signal to be generated. The reset signal of the integrator 74 rises at the rising edge of the output of the sensor SA and falls at the falling edge of the output of the sensor SH. The conversion start signal is generated from the output signal of the sensor SL.

For detecting and controlling the positions through which the light beams pass by using the sensors SI and SJ or the sensors SJ and SK, the main control section 51 transmits a selection signal for selecting the differential amplifier 72 or 71 to the selection circuit 73. As a result, the main control section 51 selects either the pair of the sensors SI and SJ or that of the sensors SJ and SK. Similarly, the main control section 51 sends a sensor selection signal to the reset signal generating circuit 78 and the conversion start signal circuit 79. As a result, the main control section 51 generates a reset signal for the integrator 74 and a digital/analog conversion start signal. The reset signal of the integrator 74 rises at the rising edge of the output of the sensor SA and falls at the falling edge of the output of the sensor SL. The conversion start signal is generated from the output signal of the sensor SQ.

Which sensor may be selected, the integral output of the integrator 74 held to the flip-flop circuit 75 is read by the main control section 51 at the timing of the signal output of the sensor SR.

As pointed out earlier, one of the four light beams is fixed and therefore three galvano-mirrors are used to move the remaining three light beams in the sub scanning direction. Three galvano-mirrors 33b, 33c, 33d are used respectively for the second, third and fourth light beams.

Figure 11:
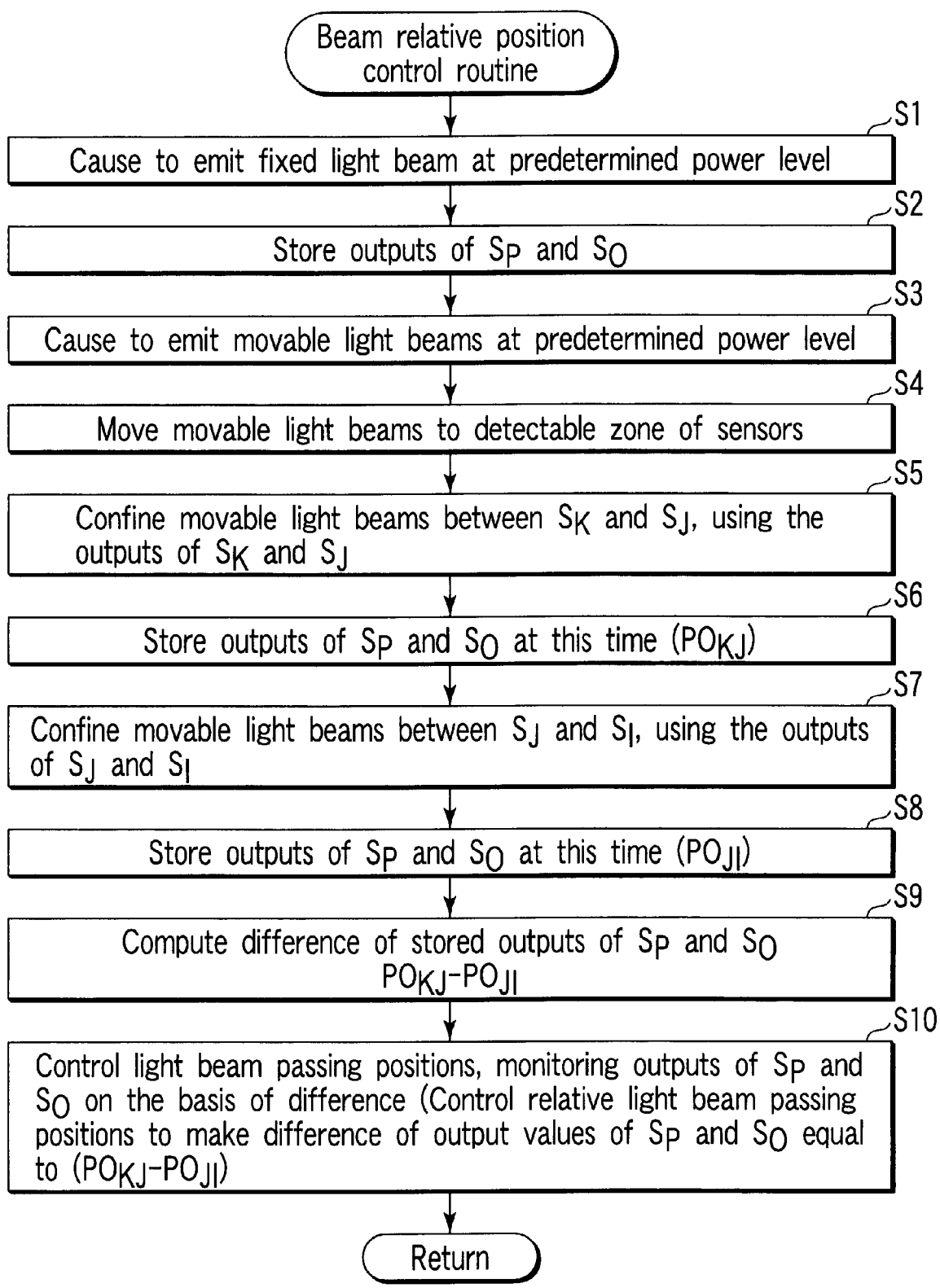
FIG. 11 is a flow chart of the operation of controlling relative positions of a light beam of the processing circuit of FIG. 10.

Now, the operation of the processing circuit 40B for dealing with the output of the above described light beam detecting section 38B will be described in terms of an operation of controlling the relative positions of the light beams of the multi-beam optical system. FIG. 11 is a flow chart of the processing circuit of 40B of FIG. 10.

Referring to FIG. 11, firstly the main control section 51 causes a fixed light beam to be emitted at a predetermined power level (Step S1). More specifically, the main control section 51 sends a predetermined signal value to the first laser driver 32a to drive the first laser oscillator 31a to emit a laser beam at the predetermined power level. As a result, the main control section 51 outputs the first light beam. At the same time, the main control section 51 drives the polygon mirror 35 to rotate.

Then, the main control section 51 sends a selection signal for selecting the differential amplifier 70 to the selection circuit 73. As a result, the main control section 51 transmits the differential output of the sensor SP and the sensor SO to the integrator 74. At the same time, the main control section 51 sends a sensor selection signal to the reset signal generating circuit 78 and the conversion start signal circuit 79. As a result, the main control section 51 generates a reset signal to be used for integrating the differential signal between the sensor SP and the sensor SO and an analog/digital conversion start signal. As a result of the processing operation of this step, the main control section 51 can take in the differential output of the sensor SP and the sensor SO.

After completing the above step, the main control section 51 reads the differential output of the sensor SP and the sensor SO (Step S2). More specifically, the main control section 51 detects the position through which the first light beam passes as reference position by using the differential output of the sensor SP and the sensor SO. In the subsequent steps, the remaining three light beams are so controlled by referring to the position through which the first light beam passes that the positions they respectively pass through are arranged at a predetermined pitch (e.g., 42.3 μm).

Then, the main control section 51 causes the movable second light beam to be emitted at a predetermined power level (Step S3). For example, the main control section 51 transmits a predetermined signal value to the second laser driver 32b and causes the second laser oscillator 31b to emit a laser beam at the predetermined power level.

The main control section 51 monitors the differential output of the sensor SP and the sensor SO. Thus, the main control section 51 can recognize the position through which the second light beam passes. Then, the main control section 51 controls the galvano-mirror 33b in such a way that the second light beam passes through the detection zones of the sensor SP and the sensor SO (Step S4). Thereafter, the main control section 51 controls the galvano-mirror 33b so that the second light beam passes near the middle of the sensor SP and the sensor SO. Note that the operation of regulating the position through which the light beam passes of this step does not require a high precision level.

Then, the main control section 51 controls the position of the second light beam that is roughly regulated in Step S4 so as to make it come to the center of the gap between the sensor SK and the sensor SJ (Step S5). The sensors SI, SJ, SP are located substantially at the middle of the sensor SP and the sensor SO. Therefore, the main control section 51 can control the position where the light beam passes so as to be located at the center of the gap between the sensor SK and the sensor SJ without significantly moving the position (and hence taking a long time). Now, the processing operation of Step ST105 will be discussed in detail.

Firstly, the main control section 51 inputs the differential output of the sensor SK and the sensor SJ to the integrator 74 by sending a selection signal for selecting the differential amplifier 71 to the selection circuit 73. At the same time, the main control section 51 sends a sensor selection signal to the reset signal generating circuit 78 and the conversion start signal circuit 79. As a result, the main control section 51 generates a reset signal to be used for integrating the differential signal of the sensor SK and the sensor SJ and an analog/digital conversion start signal. With this arrangement, the main control section 51 now can read the differential output of the sensor SK and the sensor SJ.

Subsequently, the main control section 51 drives the galvano-mirror 33b for the second light beam to control the position where the second light beam passes so as to make it come to the center of the gap between the sensor SK and the sensor SJ. For driving the galvano-mirror 33b, firstly the main control section 51 sets a signal value in the D/A converter 45b. The analog signal produced by the D/A converter 45b is input to the driver 46b and the galvano-mirror 33b operates according to the output current value of the driver 46b. Therefore, the main control section 51 can modify the position where the second light beam passes by modifying the signal value in the D/A converter 45b.

Then, the main control section 51 reads the output obtained by integrating the differential output of the sensor SP and the sensor SO, holding the arrangement made for the galvano-mirror 33b in Step S5 (Step S6). The main control section 51 stores the value (POKJ) in the memory 52.

Thereafter, the main control section 51 controls the second light beam that is placed at the center of the gap between the sensor SK and the sensor SJ in Step S6 so as to place it now at the center of the gap between the sensor SJ and the sensor SI (Step S7).

Firstly, the main control section 51 inputs the differential output of the sensor SJ and the sensor SI to the integrator 42 by sending a selection signal for selecting the differential amplifier 72 to the selection circuit 73. At the same time, the main control section 51 transmits a sensor selection signal to the reset signal generating circuit 78 and the conversion start signal circuit 79. As a result, the main control section 51 generates a reset signal to be used for integrating the differential signal of the sensor SJ and the sensor SI and an analog/digital conversion start signal. With this arrangement, the main control section 51 now can read the differential output of the sensor SJ and the sensor SI.

Subsequently, the main control section 51 drives the galvano-mirror 33b for the second light beam to control the position where the second light beam passes so as to make it come to the center of the gap between the sensor SJ and the sensor SP as in Step S5.

Then, while the second light beam is passing through the center of the gap between the sensor SJ and the sensor SI, the main control section 51 reads again the output obtained by integrating the differential output of the sensor SP and the sensor SO and stores the value (POJI) it reads in the memory 52 (Step S8).

Thereafter, the main control section 51 computationally determines the difference between the value POKJ stored in the memory 52 in Step S6 and the value POJI stored in the memory 52 in Step S8 (Step S9). The pitch separating the middle position between the sensor SK and the sensor SJ and the middle position between the sensor SJ and the sensor SI is 42.3 μm. Therefore, the distance by which the light beam is moved from the position determined in Step S5 (Step S6) to the position determined in Step S7 (Step S8) is 42.3 μm. Thus, the difference between the value POKJ computationally determined in this step and the value POJI is equal to the differential output of the sensor SP and the sensor SO, and which corresponds to the traveling distance (42.3 μm) of the second light beam.

Then, the main control section 51 controls the pitch between the position where the fixed light beam (the first light beam) passes and the position where the second light beam passes to make it equal to 42.3 μm (Step S10). The differential output of the sensor SP and the sensor SO is used for the processing operation of this step.

The position where the first light beam that is a fixed light beam passes is detected in Step S2. The main control section 51 controls the position where the second light beam passes by operating the galvano-mirror 33b in such a way that the position where the movable second light beam passes is separated from the first light beam by the pitch of 42.3 μm.

In other words, the main control section 51 modifies the position where the second light beam passes in such a way that the difference between the differential value stored in Step S2 and the differential value of the sensor SP and the sensor SO that represents the position where the second light beam passes agrees with the value obtained in Step S9 (POKJ–POJI).

As a result of the above described sequence of operation, the position where the first light beam passes and the position where the second light beam passes are so controlled as to show a pitch of 42.3 μm. By resorting to a similar processing operation, all the four light beams of the first through fourth light beams are arranged at a pitch of 42.3 μm.

As described above, with the second embodiment, the positions where the light beams of a multi-beam optical system respectively pass are detected by using paired sensors showing a saw-toothed pattern with a narrowed width for marginally located teeth including the most upstream ones as viewed in the main scanning direction of the light beams.

As a result, a highly accurate light beam scanning apparatus having a detection zone much wider than that of any conventional light beam scanning apparatus for each of a plurality of light beams is realized without raising the cost of the elements of the entire circuit.

Additionally, with the first and second embodiments, the detection accuracy can be improved simply by modifying the sensor patterns for detecting light beams so that the accuracy of detection of the positions of light beams can be improved in a simple manner without requiring a complex circuit configuration and circuit control systems.

Now, the third embodiment of the invention will be described below.

This third embodiment is realized by adding a circuit for correcting the output of the light beam detecting section 38A of the first embodiment of light beam scanning apparatus. The correcting operation is used to prevent the output of the integrator from becoming saturated by using a correction pulse when the signal from the sensor SP or the sensor SO becomes greater than a predetermined value. In other words, in the third embodiment, the amplitude of the input signal of the integrator 62 is observed and controlled to prevent the output signal of the integrator 62 from becoming saturated in order to make the light beam scanning apparatus adapted to operate accurately for a wide detection zone.

FIG. 12 is a schematic block diagram of the processing circuit 40 for processing the output of the light beam detecting section of the third embodiment. It will be appreciated that FIG. 12 is obtained by adding a correction circuit to the circuit configuration of FIG. 5. The circuit configuration of FIG. 12 differs from that of FIG. 5 in that a correction pulse generating circuit 81, differential amplifiers 82, 83 and a timing sensor SS are added there. The correction pulse generating circuit 81 generates a correction pulse. The differential amplifiers 82, 83 are arranged between the current/voltage conversion amplifiers (I/V1, I/V2) and the differential amplifier 61. The timing sensor SS is used to providing the timing for generating a correction pulse. The components same as or similar to those of FIG. 5 are denoted respectively by the same reference symbols and will not be described any further.

Now, the operation of the processing circuit 40C will be described by assuming that the light beam passes through a position located lower than the middle of the sensor SP and the sensor SO relative to the light beam detecting section 38A in FIG. 12.

Firstly, when the correction pulse from the correction pulse generating circuit 81 is made to show the reference pulse form and hence no correction is to be made, an ordinary light beam detecting operation is conducted as in the case of the circuit of FIG. 5. As a result of the detecting operation, the output signal of the integrator 62 is fed to the main control section (CPU) 51 by way of the comparators (CMP1, CMP2) and the flip-flop circuits (F/F1, F/F2). Then, the CPU 51 determines if a correcting operation is necessary or not by seeing if the output signal of the integrator 62 is found near the supply voltage (Vmax) or the ground level (Vmins).

If it is determined by the CPU 51 that a correcting operation is necessary, the CPU 51 determines which of the outputs of the paired sensors SP and SO needs correction. More specifically, when the output signal of the integrator 62 is located close to the supply voltage (Vmax), the CPU 51 determines that the output of the sensor SP needs correction. When, on the other hand, the output signal of the integrator 62 is located close to the ground level (Vmin), the CPU 51 determines that the output of the sensor SO needs correction.

Thus, the processing circuit 40C corrects the output of the sensor SP when the output signal of the integrator 62 is found near the supply voltage (Vmax) and it corrects the output of the sensor SO when the output signal of the integrator 62 is found near the ground level (Vmin).

If, for example, the output signal of the integrator 62 is found near the ground level (Vmin), the processing circuit 40C corrects the output of the sensor SO. To do this, the CPU 51 reads the outputs of the flip-flop circuits (F/F1, F/F2) and, if it found that the output of the integrator is located close to Vmin, it determines that the output of the sensor SO needs correction.

As the CPU 51 determines that the output of the sensor SO needs correction, it sends a control execution signal signifying that a correcting operation is to be conducted and a sensor selection signal indicating that the sensor SO is the sensor to be corrected to the correction pulse generating circuit 81.

Additionally, the CPU 51 transmits an D/A data indicating the amplitude of the correction pulse to the correction pulse generating circuit 81. A predetermined value is used for the value indicated by the D/A data. Alternatively, the value indicated by the D/A data may be obtained by gradually regulating a predetermined initial value.

The correction pulse generating circuit 81 is adapted to supply a correction pulse onto to the output of the sensor SO according to the command from the CPU 51. In other words, the correction pulse signal for the sensor SP is set to a reference voltage so that no correction may be made to the output of the sensor SP.

After the above operation, the circuit of FIG. 12 corrects the output of the sensor SO when the light beam passes through the sensor. The correction pulse generating circuit 81 generates a correction pulse (OPULS) when the light beam passes through the sensor SS. The generated correction pulse (OPULS) is input to the differential amplifier 83. On the other hand, the sensor SP and the sensor SO generate respective current outputs as the light beam passes through them. The current output of the sensor SP and that of the sensor SO are converted into voltage signals respectively by the current/voltage conversion amplifiers (I/V1, I/V2), which are then input respective to the differential amplifiers 82, 83.

The differential amplifier 83 computes the difference between the output voltage of the current/voltage conversion amplifier (I/V2) of the sensor SO and the corrected voltage that is the correction pulse (OPULS) transmitted from the correction pulse generating circuit 81. The voltage output obtained as the difference is used as VD3.

The differential amplifier 82, on the other hand, computes the difference between the output voltage of the current/voltage conversion amplifier (I/V1) of the sensor SP and the reference voltage (PPULS) transmitted from the correction pulse generating circuit 81. The voltage output obtained as the difference is used as VD2. If the gain of the differential amplifier 82 is one, the VD2 is equal to the output voltage of the current/voltage conversion amplifier (I/V1).

Then, the differential amplifier 81 computes the difference between the VD2 and the VD3. The outcome of the computation is input to the integrator 62 as output voltage. Then, the integrator 62 integrates the output voltage of the differential amplifier 81. The window comparators, the A/D converters and the flip-flop circuits operate same as their counterparts of FIG. 5 and hence will not be described here any further.

Similarly, if the light beam passes through a position located higher than the middle of the sensor SP and the sensor SO relative to the light beam detecting section 38A in FIG. 12, the CPU 51 operates to supply a correction pulse that correct only the output of the sensor SP. In other words, the correction pulse (PPULS) operates as correction voltage representing a corrected value and the correction pulse (OPULS) is used as reference voltage that does not require any correction. As a result, only the output signal of the sensor SP is corrected.

As described above, the output of the integrator is prevented from becoming saturated by means of a correction pulse representing the correction value selected by the CPU. As a result, the output of the integrator does not become saturated and correctly shows the detected position of the light beam if a large amplification factor is used for the current/voltage conversion amplifier and the integration constant of the integrator is made highly sensitive.

Figure 13:
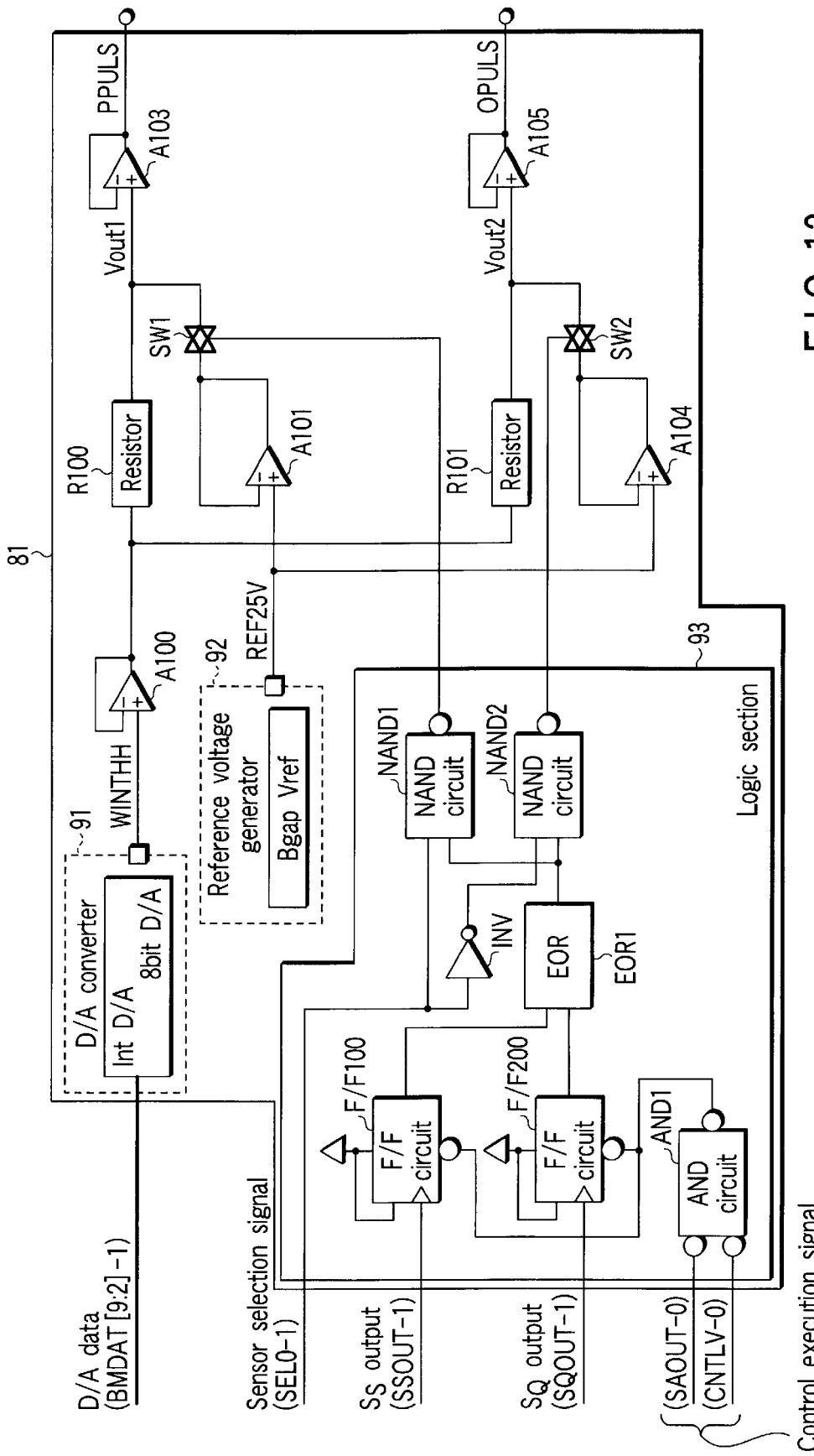
FIG. 13 is a schematic block diagram of the correction pulse generating circuit of FIG. 12.

FIG. 13 is a schematic block diagram of the correction pulse generating circuit 81 of FIG. 12. The correction pulse generating circuit 81 of FIG. 13 comprises a D/A converter 91, a reference voltage generating section 92, a logic section 93, resistors (R100, R101), operational amplifiers (A100, A101, A103, A104) and analog switches (SW1, SW2).

The D/A converter 91 regulates the amplitude of the correction pulse. The D/A converter 91 generates an analog voltage on the basis of the D/A data supplied from the CPU 51 and supplies it to the operational amplifier A100. The D/A data is a digital data indicating the analog voltage to be generated.

The reference voltage generating section 92 of the correction pulse generating circuit 81 generates and outputs a reference voltage. In the instance of FIG. 13, it generates 2.5V as reference voltage for a 0 to 5V single power supply system and supplies it downstream.

The operational amplifiers (A100, A101, A103, A104) and the analog switches (SW1, SW2) generates a correction pulse according to the signals from the above described components.

The logic circuit 93 comprises an AND circuit (AND1), flip-flop circuits (F/F100, F/F200), an exclusive OR circuit (EOR1) and NAND circuits (NAND1, NAND2).

The logic circuit 93 selects the sensor to be corrected according to the sensor selection signal (SEL0-1) from the CPU 51. Additionally, the logic section 93 determines if a correcting operation is to be conducted or not according to the control execution signal (SAOUT-0, CNTLV-1) from the CPU 51.

Furthermore, the logic section 93 switches the analog switches (SW1, SW2) at the timing of the output of the sensor SS (SSOUT-1) and that of the output of the sensor SQ (SQOUT-1).

Now, the operation of the correction pulse generating circuit 81 will be described below.

Firstly, the part including the D/A converter 91, the operational amplifiers A100, A101, A103, the analog switch (SW1), the resistor (R100) and the reference voltage generating section 92 will be discussed. These components form a circuit (correction pulse generating section for sensor SO) for generating a correction pulse (PPULS) that corrects the output of the sensor SP.

The D/A converter 91 generates an analog voltage according to the D/A data supplied from the CPU 51. The analog voltage generated by the D/A converter 91 is input to the non-inverting terminal of the operational amplifier A100. The amplitude of the correction pulse is regulated by the analog voltage generated by the D/A converter 91.

The operational amplifier A100 is a voltage follower. Therefore, the output of the D/A converter 91 is also output from the operational amplifier A100. The reference voltage generating section 92 supplies 2.5V that is the reference voltage of the correction pulse generating circuit 81. This output (reference voltage) is supplied to the non-inverting input terminal of the operational amplifier A101.

When the analog switch SW1 is OPEN, the output of the operational amplifier A100 is output by way of the voltage follower of the operational amplifier A103 as correction pulse (PPULS) for correcting the output of the sensor SP. In other words, when the analog switch SW1 is OPEN, the analog voltage produced by the D/A converter 92 according to the D/A data fed from the CPU 51 is output as correction pulse (PPULS).

When, on the other hand, the analog switch SW1 is CLOSED, the operational amplifier A101 is driven to bring the potential of the non-inverting input terminal of the operational amplifier A101 to 2.5V. Thus, the potential of the non-inverting input terminal of the operational amplifier A103 is also brought to 2.5V so that the voltage follower of the operational amplifier A103 outputs 2.5V as PPULS. In short, when the analog switch SW1 is CLOSED, the output of the reference voltage generating section 92 is output from the operational amplifier A103 as PPULS.

Thus, it is possible to select the output (reference voltage) of the reference voltage generating section 92 or the output (analog voltage according to D/A data) of the D/A converter 91 as PPULS by turning ON/OFF the analog switch SW1 at certain timing.

The part including the D/A converter 91, the operational amplifiers A100, A101, A103, analog switch (SW1), the resistor (R100) and the reference voltage generating section 92 forms a circuit (correction pulse generating section for sensor SO) for generating a correction pulse (OPULS) for correcting the output of the sensor SO.

In the correction pulse generating section for the sensor SO again, a correction pulse (OPULS) is generated by the operational amplifiers A104, A105 as in the correction pulse generating section for the sensor SP. The operational amplifier A104 and operational amplifier A105 of this part operate like the operational amplifier A101 and the operational amplifier A103 of the correction pulse generating section for the sensor SO. Thus, it is possible to select the output (reference voltage) of the reference voltage generating section 92 or the output (analog voltage according to D/A data) of the D/A converter 91 as OPULS by turning ON/OFF the analog switch SW2 at certain timing.

The analog switches are turned ON/OFF at the timings of generation of the sensor selection signal and the outputs of the sensor SS and the sensor SQ.

The sensor selection signal (SELO-1) becomes to [1] when correcting the output of the sensor SO. As a result, one of the inputs of the NAND circuit (NAND1) becomes [1] and one of the inputs of the NAND circuit (NAND2) becomes [0]. Thus, the output of the NAND circuit (NAND1) changes according to the output of the EOR1. On the other hand, the output of the NAND circuit (NAND2) remains to be constantly equal to 1 regardless of the output of the EOR1.

Therefore, the analog switch SW1 is turned ON/OFF by the output of the NAND circuit (NAND1) at the timings of output of the sensors SS and SQ. The analog switch SW2 is constantly held ON (CLOSED) by the output of the NAND circuit (NAND2). Thus, the output signal PPULS of the operational amplifier A103 becomes a pulse-shaped signal at the timings of output of the sensors SS and SQ. On the other hand, the output signal OPULS of the operational amplifier A105 is held to 2.5V, which is the output voltage of the reference voltage generating section 92.

With the above described arrangement, a desired pulse-shaped signal can be generated within a time span between the timing of output of the sensor SS and that of the sensor SQ.

Figure 14:
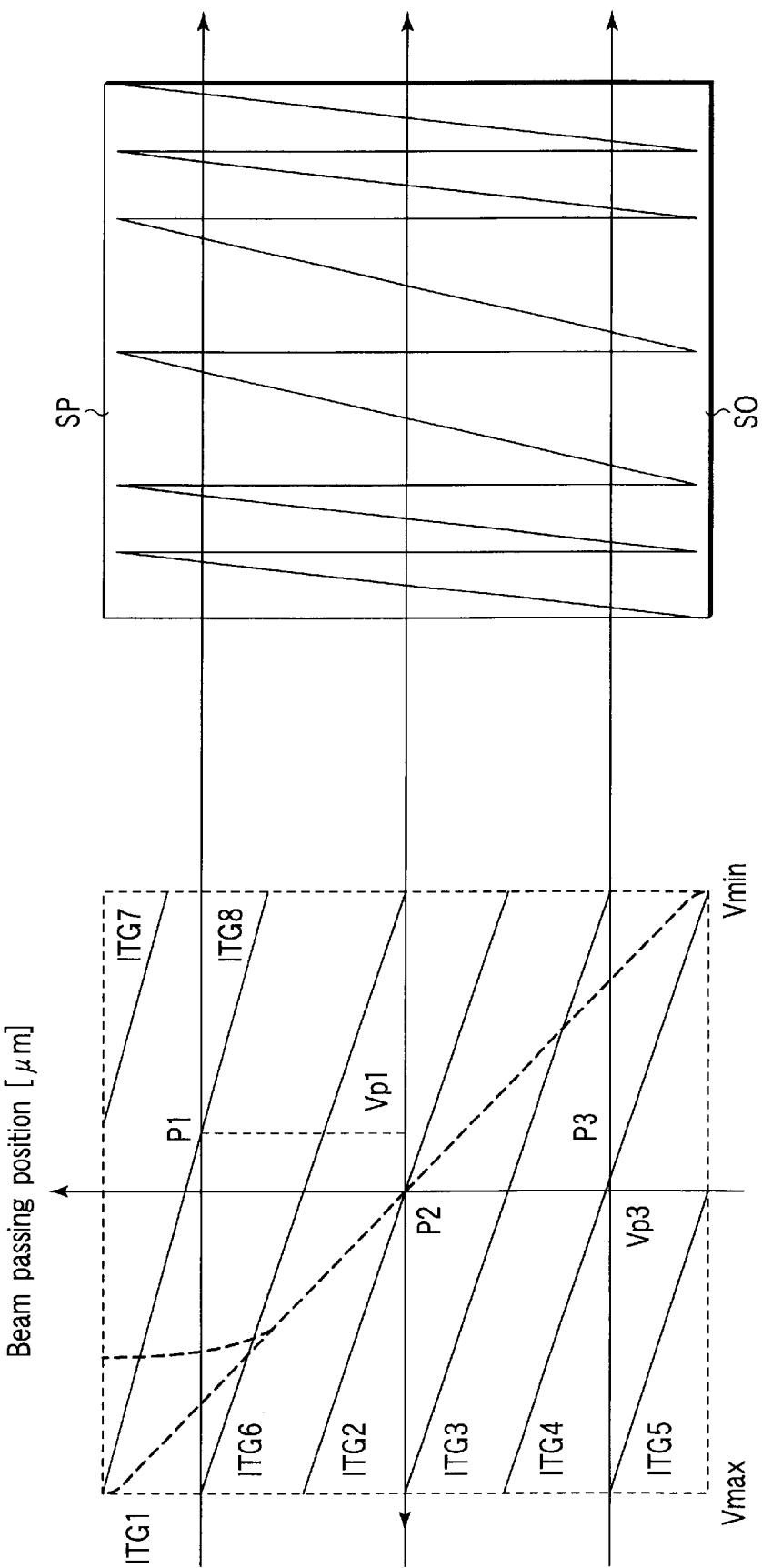
FIG. 14 is a graph schematically illustrating the output of the integrator for a position through which a light beam passes.

FIG. 14 is a graph schematically illustrating the relationship between the position through which a light beam passes and the output of the integrator. In FIG. 14, the output of the integrator produced in response to the differential output of the sensor SP and the sensor SO is one of ITG2 through ITG8 depending on the D/A value of the correction pulse generating section 81. In FIG. 14, ITG2 is the integral output (beam detection characteristic) when correction is to be made. In FIG. 14, ITG1 indicated by a broken line is output for using the entire area of the sensors SP and SO as effective detection zone without correction. As clearly seen from FIG. 14, the detection accuracy can be improved without reducing the effective detection zone by correcting the sensitivity of the integrator to keep it highly sensitive.

FIG. 15 is a flow chart of the operation of the processing circuit 40C when a light beam is made to strike the light beam detecting section 38A.

Referring to FIG. 15, firstly the main control section (CPU) 51 causes a light beam to be emitted with a predetermined intensity level (Step S21). As the light beam is emitted, the CPU 51 reads the output signal of the sensor SP and that of the sensor SO without any correction (Step S22). At this time, the CPU 51 makes the control execution signal (CNTLV-1) equal to "0" in order to drive the circuit without any correction.

After reading the output signals of the sensors SP and SO, the CPU 51 determines if correction is necessary or not on the basis of the values of the output signals (Step S23). If it is determined that correction is necessary (Step S23, YES), the CPU 51 makes the control execution signal (CNTLV-1) equal to "1" (Step S24). Then, the CPU 51 once again determines if it is necessary to correct the output of the sensor SP and/or that of the sensor SO or not on the basis of the data it reads (Step S25).

If it is determined that it is necessary to correct the output of the sensor SO, the CPU 51 makes the sensor selection signal SELO-1 indicating the object of correction equal to "1" (Step S26). Then, the CPU 51 selects a predetermined value as D/A data depending on the value of the output signal of the sensor SO (Step S27).

After sending these signals to the correction pulse generating circuit 81, the CPU 51 once again reads the output signal of the sensor SP and that of the sensor SO (Step S28). Then, the CPU 51 determines if a more appropriate value is selected for the D/A data by the read values of the sensors SO and SP (Step S29). If the CPU 51 judges that the value of the D/A data is not appropriate in Step S29, it returns to Step S27 and reselects a value for the D/A data. If, on the other hand, the CPU judges that the value of the D/A data is appropriate (Step S29, YES) or if it is determined in Step S23 that no correction is necessary (Step S23, NO), the CPU 51 judges the outcome of the operation of detecting the position of the light beam. Then, the CPU 51 controls the related components to bring the light beam to the desired position on the basis of its judgment (Step S30).

If, on the other hand, the CPU 51 determines in Step S23 that it is necessary to correct the output of the sensor SP, it makes the sensor selection signal SEL0-1 indicating the object of correction equal to "0" (Step S31). Then, the CPU 51 selects a predetermined value as D/A data depending on the value of the output signal of the sensor SP (Step S32).

After sending these signals to the correction pulse generating circuit 81, the CPU 51 once again reads the output signal of the sensor SP and that of the sensor SO (Step S33). Then, the CPU 51 determines if a more appropriate value is selected for the D/A data by the read values of the sensors SO and SP (Step S34). If the CPU 51 judges that the value of the D/A data is not appropriate in Step S34, it returns to Step S32 and reselects a value for the D/A data. If, on the other hand, the CPU judges that the value of the D/A data is appropriate (Step S34, YES), the CPU 51 judges the outcome of the operation of detecting the position of the light beam. Then, the CPU 51 controls the related components to bring the light beam to the desired position on the basis of its judgment (Step S30).

As described above, with the third embodiment, it is possible to detect the position of the light beam over the entire area of the sensor SO and sensor SP and improve the accuracy of detection of the light beam position if compared with the first and second embodiments that are not adapted to correct the output of the sensor SO and that of the sensor SP showing a profile as described above.

Additionally, with the third embodiment, when the gain of the current/voltage conversion amplifier is further raised and the integration constant RC of the integrator is made more sensitive, the light beam position can be detected by regulating the amplitude of the correction pulse (the value of the D/A data) correspondingly. In this way, it is possible to improve the accuracy of detection of the light beam position.

Now, the fourth embodiment of the invention will be described below.

The fourth embodiment is realized by applying the correcting mechanism described above in terms of the third embodiment to a light beam scanning apparatus having a multi-beam optical system described above in terms of the second embodiment. Assume that, in the following description of the fourth embodiment, one of the light beams is fixed. However, it may be appreciated that, if all the light beams are movable, the fourth embodiment can be made operable by determining the position of one of the light beams, following the process as described above by referring to the first or third embodiment. In the following description of the fourth embodiment, the positions through which the movable light beams respectively pass are controlled so as to be arranged at a predetermined pitch by referring to the position where the fixed light beam passes.

FIG. 16 is a schematic block diagram of the processing circuit 40D for processing the output of the light beam detecting section of the fourth embodiment.

The processing circuit 40D of FIG. 16 differs from the processing circuit 40B of FIG. 10 in that differential amplifiers 102 and 103 are added to the upstream of the differential amplifier 61 and a timing sensor SS and a correction pulse generating circuit 101 are additionally provided in order to generate a correction pulse. Otherwise, the circuit 40D is identical with the circuit 40B and hence the components of FIG. 16 that are same as or similar to those of FIG. 10 are denoted respectively by the same reference symbols and will not be described any further. The correction pulse generating circuit 101, the differential amplifier 102 and the differential amplifier 103 respectively operate like the correction pulse generating circuit 81, the differential amplifier 82 and the differential amplifier 83 described above for the third embodiment.

In the processing circuit 40D of FIG. 16, the correction pulse generating circuit 101 is connected to a main control section 51, a timing sensor SS and another timing sensor SQ and the differential amplifier 102 and the differential amplifier 103 are connected respectively to a sensor SO and a sensor SP.

In the processing circuit 40D, the output of the integrator 74 reflecting the positions of the light beams is input to the main control section 51 as the processing circuit 40D operates like the processing circuit 40B. As a result, the main control section 51 determines if correction is necessary or not on the basis of the output of the integrator 74. If it is determined that correction is necessary, the main control section 51 selects the sensor that requires correction as object of correction and selects a D/A data indicating the value of the correction pulse to be used for the correction. At this time, the main control section 51 outputs a control execution signal signifying that a correcting operation is to be conducted, a sensor selection signal indicating that the sensor selected as object of correction and an A/D data indicating the amplitude of the correction pulse to the correction pulse generating circuit 101. Additionally, the main control section 51 transmits a control signal to the selection circuit 73 so as to make it select the differential amplifier 70.

The correction pulse generating circuit 101 applies a correction pulse showing a voltage value indicating the D/A data to the differential amplifier 102 (or 103) connected to the sensor SO (or SP, whichever appropriate) that is selected by the sensor selection signal from the main control section 51. At this time, the correction pulse applied to the differential amplifier 103 (or 102) connected to the sensor SP (or SO, whichever appropriate) that is not selected by the sensor selection signal is set to the reference voltage. The correction pulses are supplied respectively to the differential amplifiers 102, 103 at the timing of detection of the light beams by the timing sensor SS.

As the differential amplifiers 102, 103 to which the respective correction pulses are supplied receive the output signals of the respective sensors SO and SP, they supply the respective differences between the correction pulses and the output signals of the sensors SO and SP to the differential amplifier 70. Thus, the differential amplifier 70 receives the output signals of the sensors SO and SP that are corrected by the respective values selected by the main control section 51.

Figure 17:
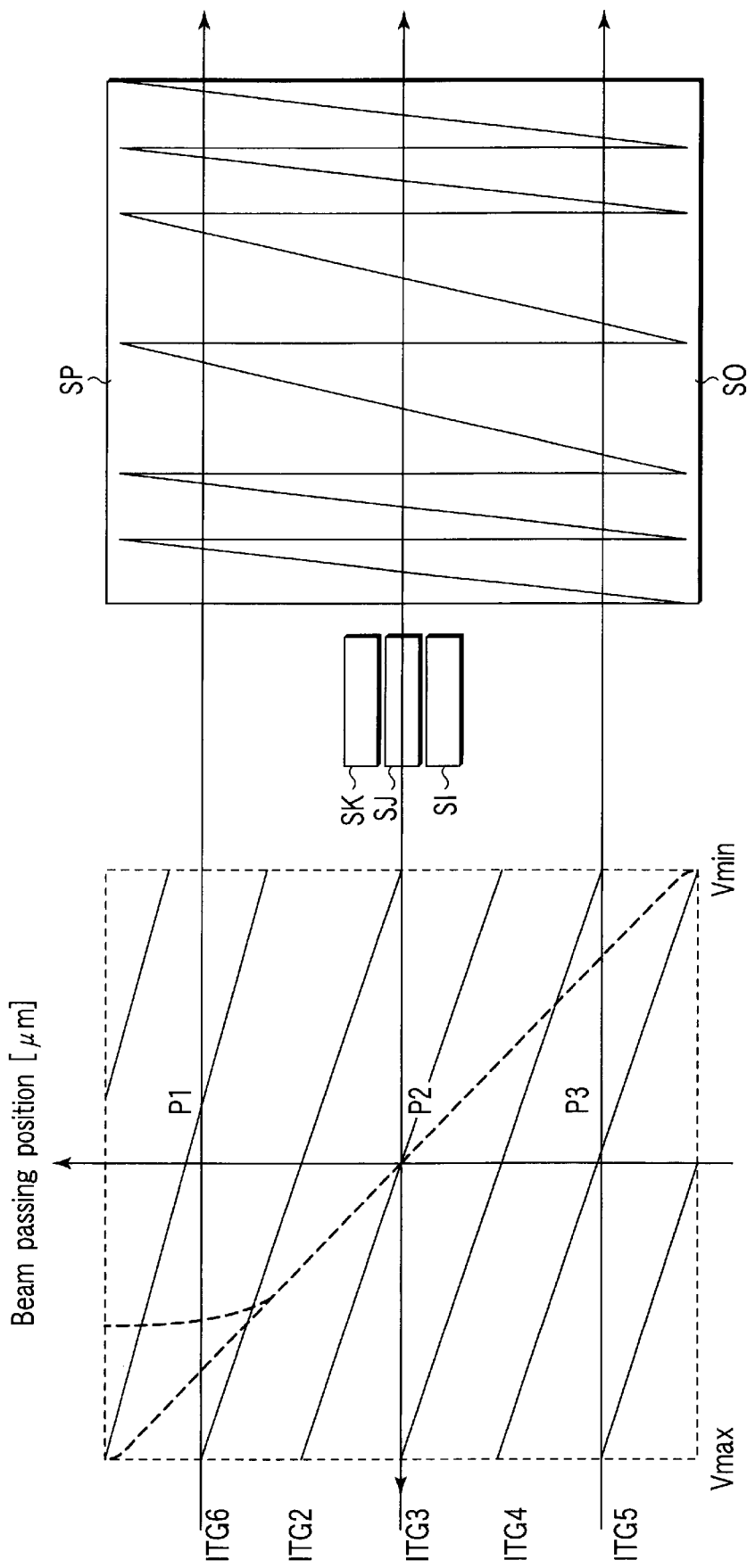
FIG. 17 is a graph schematically illustrating the output of the integrator for positions through which respective light beams pass as obtained by means of the processing circuit of FIG. 16.

FIG. 17 is a graph schematically illustrating the relationship between the positions where the light beams passe and the output of the integrator. Referring to FIG. 17, the output of the integrator produced in response to the differential output of the sensor SP and the sensor SO is one of ITG2 through ITG6 depending on the D/A value of the correction pulse generating section 81. In FIG. 17, ITG2 is the integral output (beam detection characteristic) when no correction is to be made.

Figure 18:
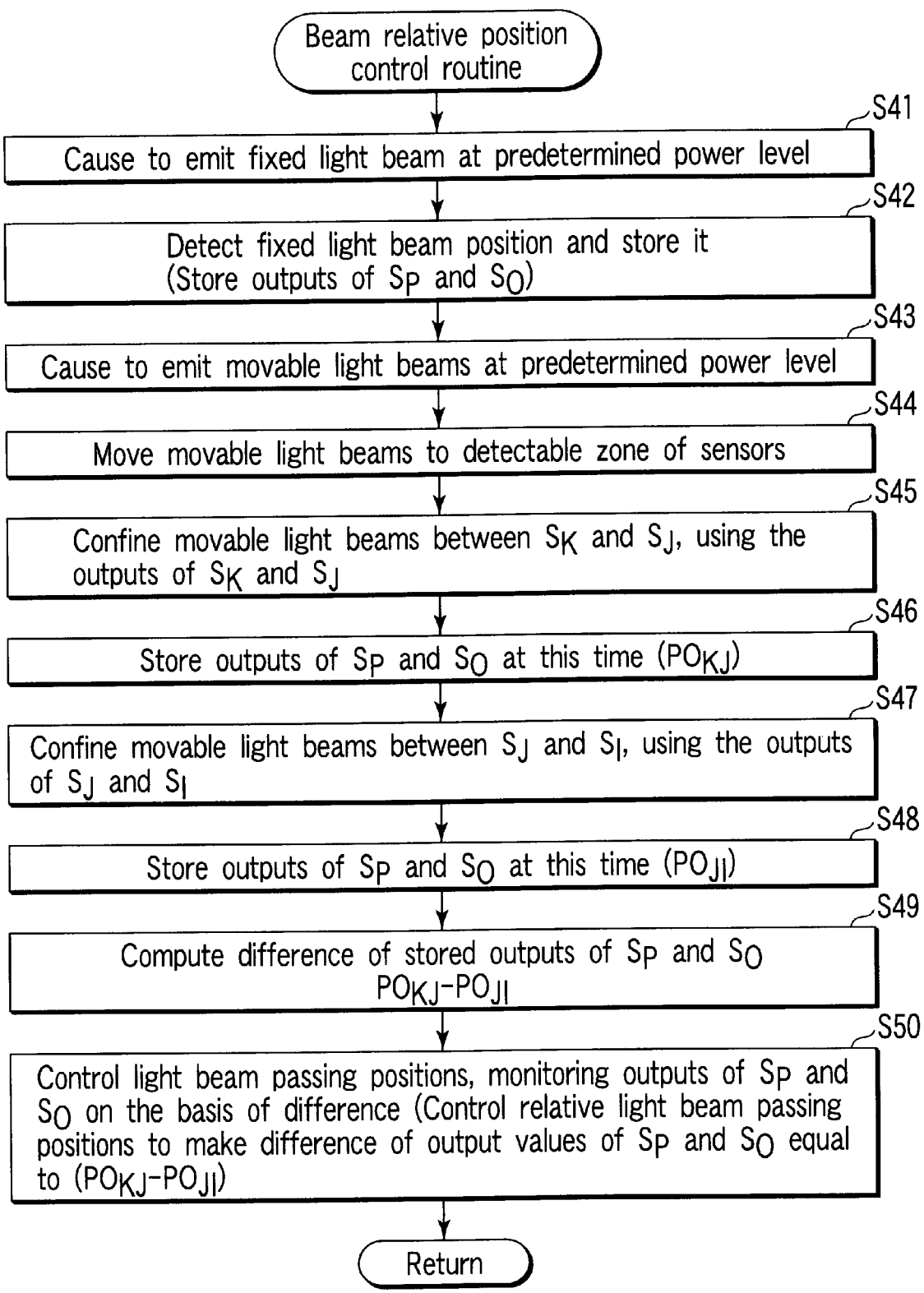
FIG. 18 is a flow chart of the control routine of the processing circuit of FIG. 16 for controlling a light beam.

Now, the operation of controlling the relative positions of the light beams in the multi-beam optical system of the fourth embodiment will be discussed below. FIG. 18 is a flow chart of the operation of the processing circuit 40D having a configuration as shown in FIG. 16.

Referring to FIG. 15, firstly the main control section (CPU) 51 causes the laser for the fixed light beam to emit a laser beam with a predetermined intensity level (Step S41). For example, the main control section 51 transmits a specified predetermined value to the first laser driver 32a to cause it to drive the first laser oscillator 31a to emit a light beam with a predetermined power level. In this way, the main control section 51 outputs the first light beam. Note that it is assumed here that the polygon mirror motor is already driven to rotate.

Then, the main control section 51 selects a D/A data as correction value and sends the selected D/A data to the correction pulse generating circuit 101. If, for example, the fixed light beam passes through position P1 in FIG. 17, the CPU 51 selects a D/A value that by turn selects the detection characteristic of ITG1. Then, the main control section 51 sends the selected D/A value to the correction pulse generating circuit 101 as D/A data.

At the same time the main control section 51 sends a selection signal for selecting the differential amplifier 70 to the selection circuit 73. Then, as a result, the main control section 51 sends the differential output of the sensor SP and the sensor SO to the integrator 74.

Similarly, the main control section 51 sends a sensor selection signal to the reset signal generating circuit 78 and the conversion start signal circuit 79. By doing this, the main control section 51 generates a reset signal to be used for integrating the differential signal between the sensor SP and the sensor SO and an analog/digital conversion start signal. As a result of the processing operation of this step, the main control section 51 can take in the differential output of the sensor SP and the sensor SO.

The processing circuit 40D outputs an output signal that corresponds to the position where the fixed light beam passes as detected by the light beam detecting section 38B having the sensor SO and the sensor SP to the CPU 51. The CPU 51 determines the detection characteristic based on the correction value as determined on the basis of the D/A value fed to the processing circuit 40D. Then, the CPU 51 detects the position where the fixed beam passes on the basis of the detection characteristic determined on the basis of the D/A value and the output signal of the processing circuit 40D. The detected position where the fixed light beam passes is stored in the memory 52 by the CPU 51 (Step S42).

If, for example, a D/A value that selects ITG1 as detection characteristic is selected in FIG. 17, the CPU 51 determines ITG1 as detection characteristic. Then, the CPU 51 detects the position where the fixed light beam passes on the basis of the ITG1 characteristic as determined by it and the output signal of the processing circuit 40D.

In the following steps, the position where the first light beam passes as detected in Step S42 is used as reference so that the positions where the remaining three light beams respectively pass are controlled and arranged at a predetermined pitch (e.g., 42.3 $\mu$m).

Thereafter, the main control section (CPU) 51 causes the laser for the movable second light beam to emit a laser beam with a predetermined intensity level (Step S43). For example, the main control section 51 transmits a specified predetermined value to the second laser driver 32b to cause it to drive the second laser oscillator 31b to emit a light beam with a predetermined power level.

As described above, the main control section 51 selects an appropriate D/A data and monitors the differential output of the sensor SP and the sensor SO on the basis of the detection characteristic corresponding to the selected D/A value. In this way, the main control section 51 can grasp the position where the second light beam passes. Then, the main control section 51 controls the galvano-mirror 33b in such a way that the second light beam passes through the detection zones of the sensor SP and the sensor SO (Step S44). Thereafter, the main control section 51 controls the galvano-mirror 33b so that the second light beam passes near the middle of the sensor SP and the sensor SO. Note that the operation of regulating the position through which the light beam passes of this step does not require a high precision level.

Then, the main control section 51 controls the position of the second light beam that is roughly regulated in Step S44 so as to make it come to the center of the gap between the sensor SK and the sensor SJ (Step S45). The sensors SI, SJ, SP are located substantially at the middle of the sensor SP and the sensor SO. Therefore, the main control section 51 can control the position where the light beam passes so as to be located at the center of the gap between the sensor SK and the sensor SJ without significantly moving the position (and hence without taking a long time). Now, the processing operation of Step S45 will be discussed in detail.

Firstly, the main control section 51 inputs the differential output of the sensor SK and the sensor SJ to the integrator 74 by sending a selection signal for selecting the differential amplifier 71 to the selection circuit 73. At the same time, the main control section 51 sends a sensor selection signal to the reset signal generating circuit 78 and the conversion start signal circuit 79. As a result, the main control section 51 generates a reset signal to be used for integrating the differential signal of the sensor SK and the sensor SJ and an analog/digital conversion start signal. With this arrangement, the main control section 51 now can read the differential output of the sensor SK and the sensor SJ.

Subsequently, the main control section 51 drives the galvano-mirror 33b for the second light beam to control the position where the second light beam passes so as to make it come to the center of the gap between the sensor SK and the sensor SJ. For driving the galvano-mirror 33b, firstly the main control section 51 sets a signal value in the D/A converter 45b. The analog signal produced by the D/A converter 45b is input to the driver 46b and the driver 46b outputs the current on the basis of the value converted by the D/A converter to the galvano-mirror 33b. The galvano-mirror 33b operates according to the output current value of the driver 46b. Therefore, the main control section 51 can modify the position where the second light beam passes by modifying the signal value in the D/A converter 45b.

Then, the main control section 51 reads once again the differential output of the sensor SP and the sensor SO, holding the arrangement made for the galvano-mirror 33b in Step S45. At this time, the main control section 51 selects the non-correction mode and detects the light beam position with the ITG2 characteristic shown in FIG. 25. This is because the sensors SI, SK, SJ are located near the middle of the sensor SP and the sensor SO and hence do not require any correction. As the light beam position is controlled to come to the center of the gap separating the sensor SK and the sensor SJ by the position detecting function, the main control section 51 stores the output value (POKJ) of the processing circuit 40 in the memory 52 (Step S46). The value of POKJ becomes to be the output value of the processing circuit 40 for indicating that the position where the light beam passes is located at the center of the gap between the sensor SK and the sensor SJ.

Thereafter, the main control section 51 controls the second light beam that is placed at the center of the gap between the sensor SK and the sensor SJ in Step S46 so as to place it now at the center of the gap between the sensor SJ and the sensor SI (Step S47).

Firstly, the main control section 51 inputs the differential output of the sensor SJ and the sensor SI to the integrator 42 by sending a selection signal for selecting the differential amplifier 72 to the selection circuit 73. At the same time, the main control section 51 transmits a sensor selection signal to the reset signal generating circuit 78 and the conversion start signal circuit 79. As a result, the main control section 51 generates a reset signal to be used for integrating the differential signal of the sensor SJ and the sensor SI and an analog/digital conversion start signal. With this arrangement, the main control section 51 now can read the differential output of the sensor SJ and the sensor SI.

Subsequently, the main control section 51 drives the galvano-mirror 33b for the second light beam to control the position where the second light beam passes so as to make it come to the center of the gap between the sensor SJ and the sensor SP as in Step S45.

Then, while the second light beam is passing through the center of the gap between the sensor SJ and the sensor SI, the main control section 51 reads again the output obtained by integrating the differential output of the sensor SP and the sensor SO. At this time, the main control section 51 selects the non-correction mode and detects the light beam position with the ITG2 characteristic shown in FIG. 25. This is because the sensors SI, SK, SJ are located near the middle of the sensor SP and the sensor SO and hence do not require any correction. As the light beam position is controlled to come to the center of the gap separating the sensor SJ and the sensor SI by the position detecting function, the main control section 51 stores the output value (POJI) of the processing circuit 40 in the memory 52 (Step S48). The value of POJI becomes the output value of the processing circuit 40D indicating that the position where the light beam passes is located at the center of the gap separating the sensor SJ and the sensor SI.

Thereafter, the main control section 51 computationally determines the difference between the value POKJ stored in the memory 52 in Step S46 and the value POJI stored in the memory 52 in Step S48 (Step S49). The pitch separating the middle position between the sensor SK and the sensor SJ and the middle position between the sensor SJ and the sensor SI is 42.3 $\mu$m. Therefore, the distance by which the light beam is moved from the position determined in Step S45 (Step S46) to the position determined in Step S47 (Step S48) is 42.3 $\mu$m. Thus, the difference between the value POJK computationally determined in this step and the value POJI, which is the difference of the output of the sensor SP and that of the sensor SO, corresponds to the traveling distance (42.3 $\mu$m) of the second light beam.

In this fourth embodiment, the detection characteristic corresponding to the selected D/A data is used to detect the position of the light beam. Therefore, the second light beam position has to be controlled according to the detection characteristic (ITG1) selected in Step S42 in order to make the relative distance between the first light beam and the second light beam equal to the predetermined pitch (42.3 $\mu$m). In other words, the output due to the second light beam is so controlled as to become equal to (the value stored in the memory 52 in Step S42)-(POKJ-POJI). Then, as a result, the position where the fixed light beam (first light beam) passes and the position where the movable second light beam passes are separated by the predetermined pitch (42.3 $\mu$m). Thus, the differential output of the sensor SP and the sensor SO is used for the above processing operation.

The position where the fixed first light beam passes is detected in Step S42 and stored in the memory 52. The main control section 51 drives the galvano-mirror 33b and controls the position where the second light beam passes in such a way that the position where the movable second light beam passes is separated from the position where the first light beam passes by the pitch of 42.3 $\mu$m.

More specifically, the main control section 51 firstly causes the second light beam to be emitted by selecting a D/A value similar to that of Step S42 for the processing circuit 40. Then, the main control section 51 modifies the position where the second light beam passes in such a way that the output value of the processing circuit 40D representing the position where the second light beam passes agrees with the value stored in the memory 52 in Step S42 less the value determined in Step S49 (POKJ-POJI) (Step S50).

As a result of the above described sequence of operation, the position where the first light beam passes and the position where the second light beam passes are so controlled as to show a pitch of 42.3 $\mu$m. By resorting to a similar processing operation, all the four light beams of the first through fourth light beams are arranged at a pitch of 42.3 $\mu$m.

As described above, with the fourth embodiment of the invention of light beam scanning apparatus adapted to multi-beam operation, the output of the processing circuit for processing the signals from the sensors is corrected to improve the detection accuracy when it is saturated. Thus, this embodiment of light beam scanning apparatus can perform accurate position control operations for multi-beam arrangements.

Now, the fifth embodiment of the invention will be described.

The above described first through fourth embodiments of light beam scanning apparatus according to the invention are adapted to process the output signals (electric currents) of the sensors SP and SO of the light beam detecting section and detects the position where a light beam passes. Such a method has a disadvantage of being relatively vulnerable to external turbulences that can influence the output signals of the sensors SP and SO because the position through which the light beam passes is detected on the basis of the output signals of the sensors SP and SO. For instance, if one or more than one reflection planes of the polygon mirror 35 are smeared, the light beam that is reflected by one of the smeared reflection planes of the polygon mirror 35 and gets to the sensors SP and SO can lose part of its intensity. Then, the sensors SP and SO may not provide desired output signals and the detection accuracy of the apparatus may be degraded. Furthermore, if a small diameter polygon mirror that can be drive to rotate at a large rpm is used in order to raise the printing speed in the image forming process, the phenomenon of vignetting can occur at the edges (of the reflecting section for reflecting the light beam to the sensors) of the polygon mirror to fluctuate the quantity of light and reduce the quantity of light getting to the light receiving sections of the sensors. Then, the detection accuracy of the apparatus will also be degraded.

This problem will be discussed further by referring to the graph of FIG. 14 showing the relationship between the integral output and the position where the light beam passes and assuming the use of the following constants.

For ITG2 (and other characteristic graph):
Vmax: 4,000 [mV]
Vmin: 1,000 [mV]
P2max: 100 [$\mu$m] (position where the light beam passes at Vmax)
P2min: -100 [$\mu$m] (position where the light beam passes at Vmin)

Then, the sensitivity of the sensors (light beam detecting sections) is expressed by the formula below.

$$(Vmax - Vmin)/(P2max - P2min) =$$
$$(4{,}000 - 1{,}000)/\{100 - (-100)\} = 15 \ [\text{mV}/\mu\text{m}]$$

Also assume that the reflection planes of the polygon mirror are smeared to reduce the reflectance of the polygon mirror by about 50%.

As the reflectance of the polygon mirror is reduced by about 50%, the quantity of laser beam reflected by the polygon mirror and striking the sensors SP and SO is reduced also by about 50%. Then, the electric current output from each of the sensors SP and SO comprising respective photodiodes is also reduced by about 50%. Thus, the integral output of the sensor processing circuit will be less than 50% of the normal level. In other words, the normal output level cannot be maintained unless the light beam is moved by a distance twice as much as an ordinary light beam.

Then, the sensitivity of the light beam detecting section will be expressed by the following values.

Vmax: 4,000 [mV]

Vmin: 1,000 [mV]

P2max: 200 [μm] (position where the light beam passes at Vmax)

P2min: −200 [μm] (position where the light beam passes at Vmin)

Then, the sensitivity of the sensors (light beam detecting sections) is expressed by the formula below.

$$(Vmax - Vmin)/(P2max - P2min) =$$
$$(4{,}000 - 1{,}000)/\{200 - (-200)\} = 7.5 \ [mV/\mu m]$$

Thus, the sensitivity of the sensors (beam detecting sections) falls to about ½ of the normal level so that the detection accuracy is degraded if the resolving power of the D/A converter remains same.

Figure 19:
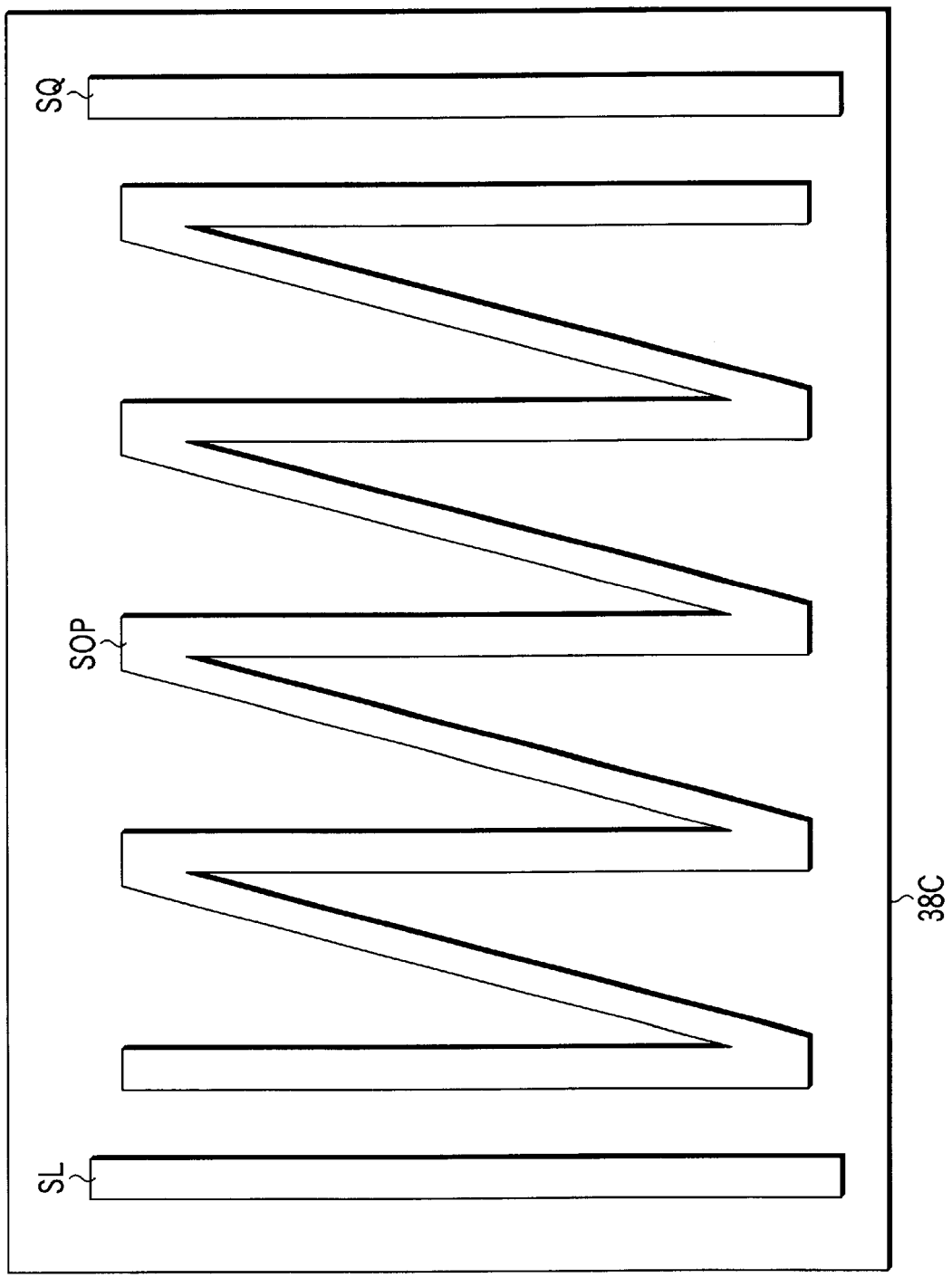
FIG. 19 is a schematic illustration of the light beam detecting section of the fifth embodiment of the invention.

FIG. 19 is a schematic illustration of the light beam detecting section 38C of the fifth embodiment of the invention, illustrating its configuration.

Referring to FIG. 19, in this fifth embodiment, the output of the sensor SOP of the light beam detecting section 38C is not used as information indicating the position where the light beam passes. In other words, in this fifth embodiment, the position where the light beam passes is not detected by seeing the level of the output signal of the sensor SOP of the light beam detecting section 38C. Therefore, this embodiment can provide high quality images stably for a long period of time without being affected by fluctuations in the quantity of light beam striking the sensor SOP of the light beam detecting section 38C due to smeared reflection planes of the polygon mirror 35 and without the problem of degraded control accuracy for detecting the position through which the light beam passes.

As shown in FIG. 19, the light beam detecting section 38C of the fifth embodiment comprises sensors SL, SOP, SQ that are formed by using respective photodiodes. The sensors SL and SQ correspond respectively to the sensors SL and SQ in FIG. 4 and the sensor SOP corresponds to the sensors SO and SP in FIG. 4. In the embodiment of FIG. 19, the sensor SOP is made of a single photodiode and has a saw-toothed profile.

While the teeth of the sensor SOP of FIG. 19 are arranged at a uniform pitch, it may alternatively show a saw-toothed pattern with a narrowed width for marginally located teeth including the most upstream ones and/or the most downstream ones when viewed in the main scanning direction for the reasons described above by referring to the first through fourth embodiments. Then, the light beam scanning apparatus comprising such a sensor SOP can detect a light beam accurately over a wide effective detection zone if compares with a light beam scanning apparatus comprising a sensor SOP having a profile as shown in FIG. 19.

Figure 20:
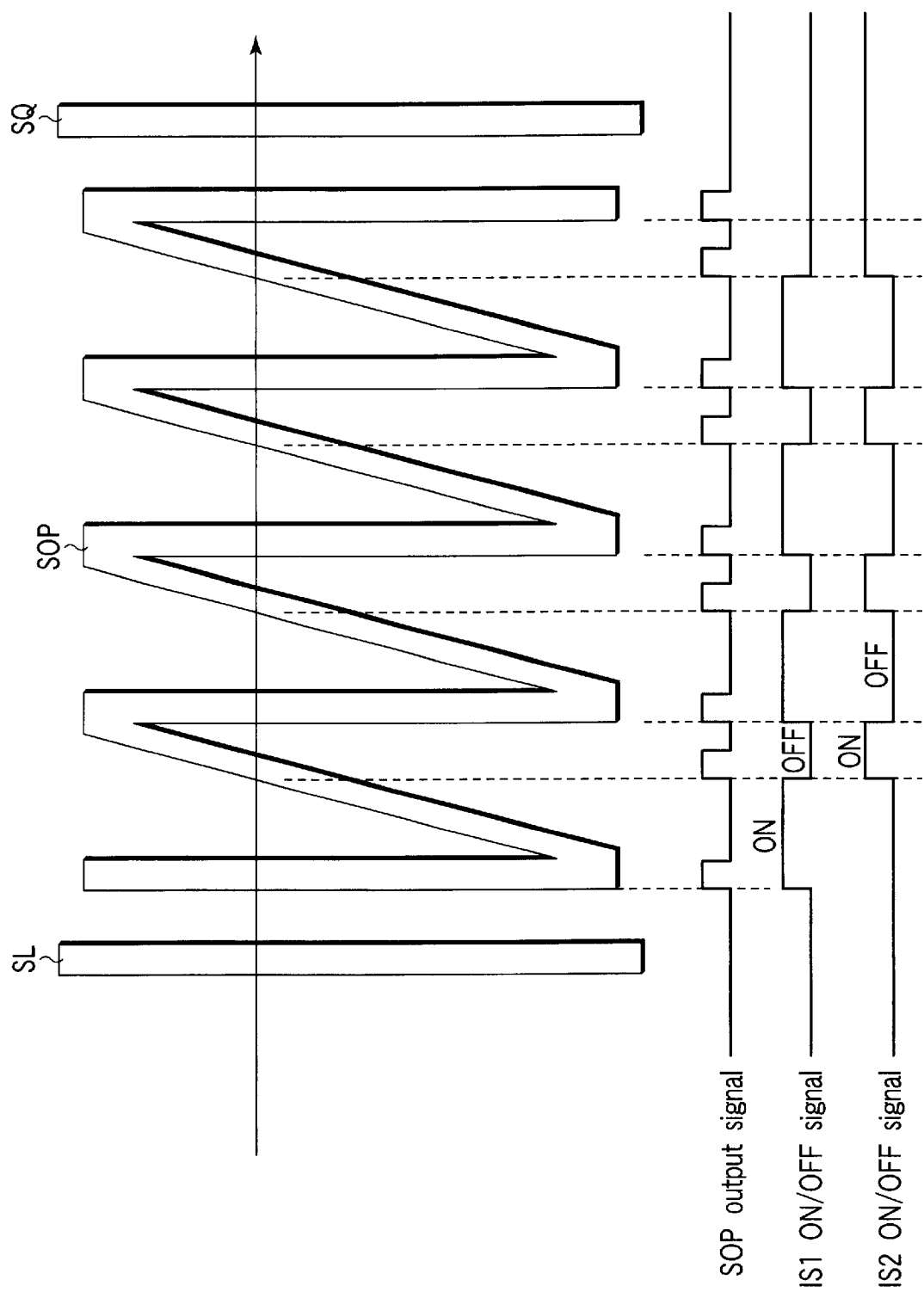
FIG. 20 is a timing chart illustrating the output signal obtained when a light beam passes through the light beam detecting section of FIG. 19.

FIG. 20 is a timing chart illustrating the output signal obtained when a light beam passes through the light beam detecting section of FIG. 19. In FIG. 20, the arrow indicates the main scanning direction. In other words, the light beam is made to scan from left to light by the polygon mirror 35 in FIG. 20. The sensor SOP produces a pulse-shaped detection output as shown in response to the scanning operation of the light beam. The detection output shows an output timing that is differentiated as a function of the position through which the light beam passes (in the sub scanning direction). When the light beam passes near the center of the sensor SOP, the output pulse signal shows a substantially same cycle period.

Figure 21:
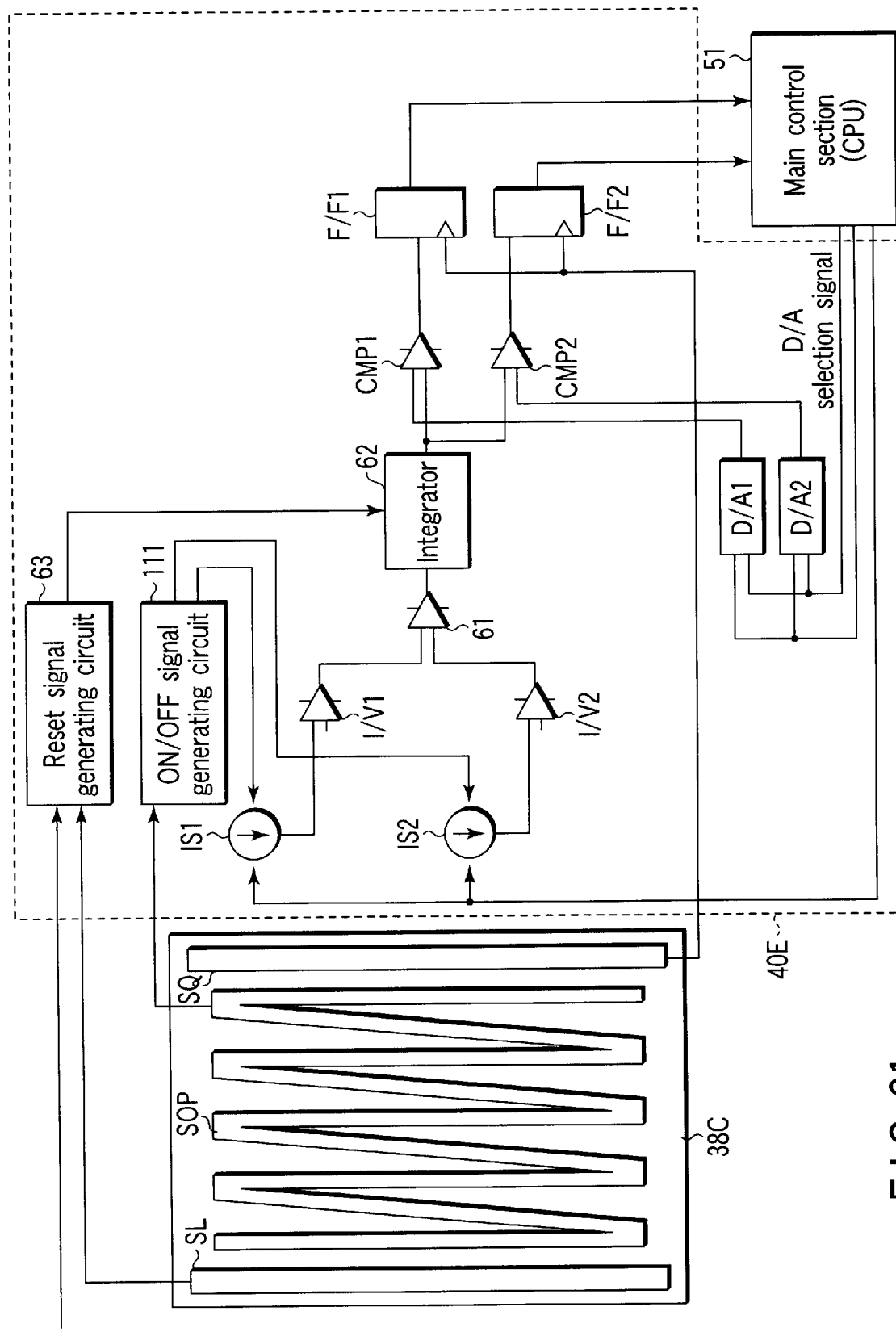
FIG. 21 is a schematic block diagram of the processing circuit for processing the output of the light beam detecting section of FIG. 19.

FIG. 21 is a schematic block diagram of the processing circuit 40E for processing the output of the light beam detecting section 38C of FIG. 19. The processing circuit 40E of FIG. 21 differs from the processing circuit 40A shown in FIG. 5 in that the processing circuit 40E comprises an ON/OFF signal generating circuit 111, an electric current source IS1 and another electric current source IS2. Otherwise, the processing circuit 40E is identical with the processing circuit 40A and hence the components thereof same as or similar to those of the processing circuit 40A are denoted respectively by the same reference symbols and will not be described any further.

Referring now to FIG. 21, the sensor SOP outputs a pulse signal as shown in FIG. 20 as a light beam passes through it. While the sensor output (electric current) of the sensor SOP is subjected to I/V conversion and binarized in reality, such operations are not shown in FIG. 21. The binarized output of the sensor SOP is input to the ON/OFF signal generating circuit 111. The ON/OFF signal generating circuit 111 generates a first ON/OFF signal for turning on/off the current source IS1 and a second ON/OFF signal for turning on/off the second current source IS2 on the basis of the output of the sensor SOP.

The current sources IS1, IS2 output respective electric currents to the I/V converters (I/V1, I/V2) according to the ON/OFF signals from the ON/OFF signal generating circuit 111. The output currents of the current sources IS1, IS2 are controlled to show desired respective constant output levels by the CPU 51. More specifically, the current sources IS1, IS2 output electric currents of the respective intensities specified by the CPU 51 according to the first and second ON/OFF signals respectively. Thus, the current sources IS1, IS2 output respectively signals reflecting the saw-toothed profile of the sensor SOP. The current sources take the role of the photodiodes of the first and second embodiments.

Then, the current/voltage converters I/V1, I/V2 converts the electric currents output from the current sources IS1, IS2 into respective voltage signals. The voltage signals correspond respectively to the I/V outputs of the sensors SP and SO having a saw-toothed profile of the first and second embodiments.

The outputs of the I/V1 and I/V2 are then input to the respective input terminals of the differential amplifier 61. The differential amplifier 61 computes the difference between the output of the current/voltage converter I/V1 and the output of the current/voltage converter I/V2. Then, the output of the differential amplifier 61 is integrated by the integrator 62. The output of the integrator 62 is then input to two window comparators CMP1, CMP2. The window comparators CMP1, CMP2 output the respective digital signals obtained by the A/D conversion of the differential amplifier 61 to the CPU 51.

The signal processing operation that follows the conversion of the outputs of the I/V1 and I/V2 is identical with that of the first embodiment.

As described above, a sensor having a saw-toothed profile is arranged relative to the main scanning direction of the light beam and the two current sources that are turned on/off each time a light beam is detected by the sensor output respective electric currents with the intensity levels specified by the CPU. Then, the electric currents from the current sources are converted into respective voltages and the difference of the two voltages is integrated to determine the position where the light beam passes. With such an arrangement, it is possible to provide a light beam scanning apparatus that is not affected by fluctuations in the output light beam and in the environment.

As pointed out above, in the fifth embodiment, the output of the sensor SOP is used as timing signal for turning on/off the current sources. This means that the electric currents output from the sensors SP and SO of the first through fourth embodiments are replaced by the electric currents output from the current sources. Therefore, with the fifth embodiment, fluctuations in the quantity of light beam striking the sensor SOP do not give rise to any problem and electric currents can be supplied from the current sources to the entire circuit with respective constant intensity levels. In other words, the fifth embodiment is free from any adverse effect of fluctuations in the quantity of light beam striking the sensor SOP. Thus, the accuracy of controlling the position where the light beam passes is not degraded for a long period of time in the fifth embodiment so that it can provide high quality images for a prolonged period of time.

Now, the sixth embodiment will be described below.

The sixth embodiment is adapted to detect the position where a light beam passes by means of a light beam detecting section 38C and turning on/off two voltage sources VS1 and VS2. In other words, while the fifth embodiment uses two current sources, the sixth embodiment uses two voltage sources. Therefore, like the fifth embodiment, this embodiment is free from any adverse effect of fluctuations in the quantity of light beam striking the sensor SOP. Thus, the accuracy of controlling the position where the light beam passes is not degraded for a long period of time in the fifth embodiment so that it can provide high quality images for a prolonged period of time.

FIG. 22 is a schematic block diagram of the light beam detecting section 38C and the processing circuit 40F for processing the output of the light beam detecting section of the sixth embodiment. The processing circuit 40F of this embodiment differs the processing circuit 40E of the fifth embodiment in that the current sources IS1 and IS2 of the processing circuit 40E are replaced respectively by voltage sources VS1 and VS2 in the sixth embodiment and no current voltage converter is arranged downstream relative to the voltage sources VS1, VS2 in the processing circuit 40F. Otherwise, the processing circuit 40F is identical with the processing circuit 40E and hence the components of FIG. 22 that are same as or similar to those of FIG. 21 are denoted respectively by the same reference symbols and will not be described any further.

In FIG. 22, reference symbols VS1, VS2 respectively denote two voltage sources. The voltage sources VS1, VS2 output voltages with the respective levels specified by the CPU 51 according to the first and second ON/OFF signals generated on the basis of the output of the sensor SOP obtained by detecting a scanning light beam. The first and second ON/OFF signals are generated by an ON/OFF signal generating circuit 111 similar to the one described above for the fifth embodiment.

Thus, the sensor SOP of the processing circuit 40F outputs a signal reflecting the saw-toothed profile of the sensor SOP. Then, the outputs of the voltage sources VS1 and VS2 are input to the differential amplifier 61, which computes the difference of the two outputs and the integrator 62 integrates the output of the differential amplifier 61. The output of the integrator 62 is used as information indicating the position where the light beam passes.

While an on/off operation takes place each time the sensor SOP having a saw-toothed profile detects a light beam in the above described fifth and sixth embodiments, the sensor SOP may be replaced by a pair of sensors SP and SO as in the first through fourth embodiments. Then, an on/off operation takes place at the current sources IS1 and IS2 or at the voltage sources VS1 and VS2 each time either of the sensors detects a light beam. The net effect will not differ from the one described above for the fifth and sixth embodiment.

As described above, a sensor having a saw-toothed profile is arranged relative to the main scanning direction of the light beam and the two voltage sources that are turned on/off each time a light beam is detected by the sensor output respective voltages at the levels specified by the CPU. Then, the difference of the voltages from the two voltage sources is integrated to determine the position where the light beam passes. With such an arrangement, it is possible to provide a light beam scanning apparatus that is not affected by fluctuations in the output light beam and in the environment.

As pointed out above, in the sixth embodiment, the output of the sensor SOP is used as timing signal for turning on/off the voltage sources. This means that the electric currents output from the sensors SP and SO of the first through fourth embodiments are replaced by the on/off timing signals extracted from the output of the sensor SOP and used to output voltages from the voltage sources VS1 and VS2. Therefore, with the sixth embodiment, fluctuations in the quantity of light beam striking the sensor SOP do not give rise to any problem and electric currents can be supplied from the current sources to the entire circuit with respective constant intensity levels. In other words, the sixth embodiment is free from any adverse effect of fluctuations in the quantity of light beam striking the sensor SOP. Thus, the accuracy of controlling the position where the light beam passes is not degraded for a long period of time in the sixth embodiment so that it can provide high quality images for a prolonged period of time.

When compared with the fifth embodiment, the sixth embodiment does not need current/voltage converters for converting electric currents into voltages so that the circuit configuration of the sixth embodiment is simplified relative to the fifth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus for scanning a surface to be scanned by means of a light beam, said apparatus comprising:

a light emitting unit which outputs a light beam;

a scanning member which causes the light beam output from the light emitting unit to scan the surface to be scanned in a main scanning direction;

a light beam detecting section which has a pair of symmetrical saw-toothed patterns with a narrowed width for marginally located teeth and are formed by arranging optical elements for converting the light beam into respective electric signals, the patterns being arranged interdigitally on the surface to be scanned or at a position equivalent to the surface;

a processing circuit which outputs the an integral value obtained by integrating the difference of the electric signals output from the respective patterns of the light beam detecting section; and a CPU which determines a passing position of the light beam output from the light emitting unit passing on the surface to be scanned on the basis of the value output from said processing circuit.

2. The apparatus according to claim 1, wherein said saw-toothed patterns of said light beam detecting section are narrowed for marginally located teeth at the downstream side or the upstream side relative to the main scanning direction.

3. The apparatus according to claim 1, further comprising:

a correction circuit which corrects the electric signal output form said light beam scanning section;

said CPU being adapted to output a signal for correcting the electric signal output from said light beam scanning section to said correction circuit on the basis of the value output from said processing circuit.

4. A light beam scanning apparatus for scanning a surface to be scanned by means of a light beam, said apparatus comprising:

a light emitting unit which outputs a plurality of light beams;

a scanning member which causes the light beams output from the light emitting unit to scan the surface to be scanned in a main scanning direction;

a light beam detecting section which has a pair of symmetrical saw-toothed patterns with a narrowed width for marginally located teeth and are formed by arranging optical elements for converting the light beam into respective electric signals, the patterns being arranged interdigitally on the surface to be scanned or at a position equivalent to the surface;

a processing circuit which outputs an integral value obtained by integrating the difference of the electric signals output from the respective patterns of the light beam detecting section;

a CPU which determines a pitch of arrangement of said plurality of light beams in a direction perpendicular to the main scanning direction on the basis of the value output from the processing circuit; and a light path modifying member which modifies passing positions of the respective light beams so as to rearrange them at a predetermined pitch under the control of the CPU.

5. The apparatus according to claim 4, wherein said saw-toothed patterns of said light beam detecting section are narrowed for marginally located teeth at the downstream side or the upstream side relative to the main scanning direction.

6. The apparatus according to claim 5, further comprising:

a passing position detection sensor which detects if each of the light beams output from said light emitting unit passes a first passing target or a second passing target separated from said first passing target by a predetermined distance in a direction perpendicular to said main scanning direction;

said CPU controls said light path modifying member by referring to a position of the fixed light beam of said plurality of light beams so as to rearrange the remaining light beams at a predetermined pitch and make said predetermined pitch agree with the distance between the first passing target and the second passing target as detected by said passing position detection sensor.

7. The apparatus according to claim 4, further comprising:

a correction circuit which corrects the electric signal output form said light beam scanning section;

said CPU being adapted to output a signal for correcting the electric signal output from said light beam scanning section to said correction circuit on the basis of the value output from said processing circuit.

8. An image forming apparatus for forming an image on an image forming medium, said apparatus comprising:

a light emitting unit which outputs a light beam;

an image carrier on which a latent image is formed by the light beam from the light emitting unit;

a scanning member which causes the light beam output from the light emitting unit to scan the surface to be scanned of the image carrier in a main scanning direction;

a light beam detecting section which has a pair of symmetrical saw-toothed patterns with a narrowed width for marginally located teeth and are formed by arranging optical elements for converting the light beam into respective electric signals, the patterns being arranged interdigitally on the surface to be scanned or at a position equivalent to the surface;

a processing circuit which outputs an integral value obtained by integrating the difference of the electric signals output from the respective patterns of the light beam detecting section; and a CPU which determines a passing position of the light beam output from the light emitting unit passing on the surface to be scanned on the basis of the integral value output from said processing circuit;

a light path modifying member which regulates the passing position of the light beam under the control of the CPU; and an image forming section which forms a latent image by causing the light beam from said light emitting unit to scan the surface to be scanned of said image carrier by means of said scanning member, turning the latent image into a visible image and transferring it on an image forming medium after the passing position of said light beam is controlled to the predetermined position.

9. The apparatus according to claim 8, wherein said saw-toothed patterns of said light beam detecting section are narrowed for marginally located teeth at the downstream side or the upstream side relative to the main scanning direction.

10. The apparatus according to claim 8, further comprising:

a correction circuit which corrects the electric signal output form said light beam scanning section;

said CPU being adapted to output a signal for correcting the electric signal output from said light beam scanning section to said correction circuit on the basis of the value output from said processing circuit.

11. An image forming apparatus for forming an image on an image forming medium, said apparatus comprising:

a light emitting unit which outputs a plurality of light beams;

an image carrier on which a latent image is formed by the plurality of light beams from the light emitting unit;

a scanning member which causes the light beams output from the light emitting unit to scan the surface to be scanned of the image carrier in a main scanning direction;

a light beam detecting section which has a pair of symmetrical saw-toothed patterns with a narrowed width for marginally located teeth and are formed by arranging optical elements for converting the light beam into respective electric signals, the patterns being arranged interdigitally on the surface to be scanned or at a position equivalent to the surface;

a processing circuit which outputs an integral value obtained by integrating the difference of the electric signals output from the respective patterns of the light beam detecting section; and a CPU which determines a pitch of arrangement of said plurality of light beams in a direction perpendicular to the main scanning direction on the basis of the value output from the processing circuit;

a light path modifying member which modifies the passing positions of the light beams so as to rearrange them at a predetermined pitch under the control of the CPU; and an image forming section which forms a latent image by causing the light beams from said light emitting unit to scan the surface to be scanned of said image carrier by means of said scanning member, turning the latent image into a visible image and transferring it on an image forming medium after the passing position of said light beam is controlled to the predetermined position.

12. The apparatus according to claim 11, wherein said saw-toothed patterns of said light beam detecting section are narrowed for marginally located teeth at the downstream side or the upstream side relative to the main scanning direction.

13. The apparatus according to claim 11, further comprising:

a correction circuit which corrects the electric signal output form said light beam scanning section;

said CPU being adapted to output a signal for correcting the electric signal output from said light beam scanning section to said correction circuit on the basis of the value output from said processing circuit.

14. The apparatus according to claim 11, further comprising:

a passing position detection sensor which detects if each of the light beams output from said light emitting unit passes a first passing target or a second passing target separated from said first passing target by a predetermined distance in a direction perpendicular to said main scanning direction;

said CPU controls said light path modifying member by referring to the position of the fixed light beam of said plurality of light beams so as to rearrange the remaining light beams at a predetermined pitch and make said predetermined pitch agree with the distance between the first passing target and the second passing target as detected by said passing position detection sensor.

15. A light beam scanning apparatus comprising:

a light emitting unit which outputs a light beam;

a scanning member which causes the light beam output from the light emitting unit to scan a surface to be scanned in a main scanning direction;

a light beam detecting section which is arranged on said surface to be scanned or at an equivalent position and has a sensor formed by patterns adapted to detect the light beam at a timing corresponding to the scanning position of the light beam in a direction perpendicular to said main scanning direction;

an ON/OFF signal generating circuit which generates a first ON/OFF signal for producing an ON/OFF action and a second ON/OFF signal for producing an inverse ON/OFF action each time a light beam is detected by said sensor of said light beam detecting section;

a first current source which outputs an electric current with a predetermined intensity according to said first ON/OFF signal;

a first current/voltage converting circuit which converts the electric current from said first current source into a voltage;

a second current source which outputs an electric current with a predetermined intensity according to said second ON/OFF signal;

a second current/voltage converting circuit which converts the electric current from said second current source into a voltage;

a processing circuit which outputs an integral value obtained by integrating the difference of the voltage from said first current/voltage converting circuit and the voltage from said second current/voltage converting circuit; and a CPU for determining a passing position of the light beam output from said light emitting unit on said surface to be scanned according to the value output from said processing circuit.

16. The apparatus according to claim 15, wherein said sensor of said light beam detecting section is formed by saw-toothed patterns.

17. The apparatus according to claim 15, wherein said sensor of said light beam detecting section is formed by saw-toothed patterns narrowed for marginally located teeth at the downstream side or the upstream side relative to the main scanning direction.

18. A light beam scanning apparatus comprising:

a light emitting unit which outputs a light beam;

a scanning member which causes the light beam output from the light emitting unit to scan a surface to be scanned in a main scanning direction;

a sensor which is arranged on said surface to be scanned or at an equivalent position and formed by patterns adapted to detect the light beam at a timing corresponding to the scanning position of the light beam in a direction perpendicular to said main scanning direction;

an ON/OFF signal generating circuit which generates a first ON/OFF signal for producing an ON/OFF action and a second ON/OFF signal for producing an inverse ON/OFF action each time a light beam is detected by said sensor;

a first voltage source which outputs a voltage of a predetermined level according to said first ON/OFF signal;

a second voltage source which outputs a voltage of a predetermined level according to said second ON/OFF signal;

a processing circuit which outputs an integral value obtained by integrating the difference of the voltage from said first voltage source and the voltage from said second voltage source; and a CPU for determining a passing position of the light beam output from said light emitting unit on said surface to be scanned according to the value output from said processing circuit.

19. The apparatus according to claim 18, wherein said sensor of said light beam detecting section is formed by saw-toothed patterns.

20. The apparatus according to claim 18, wherein
said sensor of said light beam detecting section is formed by saw-toothed patterns narrowed for marginally located teeth at the downstream side or the upstream side relative to the main scanning direction.

21. An image forming apparatus for forming an image on an image forming medium, said apparatus comprising:
a light emitting unit which outputs a light beam;
an image carrier on which a latent image is formed by the light beam from the light emitting unit;
a scanning member which causes the light beam output from the light emitting unit to scan a surface to be scanned in a main scanning direction;
a light beam detecting section which is arranged on said surface to be scanned or at an equivalent position and has a sensor formed by patterns adapted to detect the light beam at a timing corresponding to the scanning position of the light beam in a direction perpendicular to said main scanning direction;
an ON/OFF signal generating circuit which generates a first ON/OFF signal for producing an ON/OFF action and a second ON/OFF signal for producing an inverse ON/OFF action each time a light beam is detected by said sensor of said light beam detecting section;
a first current source which outputs an electric current with a predetermined intensity according to said first ON/OFF signal;
a first current/voltage converting circuit which converts the electric current from said first current source into a voltage;
a second current source which outputs an electric with a predetermined intensity according to said second ON/OFF signal;
a second current/voltage converting circuit which converts electric current from said second current source into a voltage;
a processing circuit which outputs an integral value obtained by integrating the difference of the voltage from said first current/voltage converting circuit and the voltage from said second current/voltage converting circuit;
a CPU for determining a passing position of the light beam output from said light emitting unit on said surface to be scanned according to the value output from said processing circuit.
a light path modifying member which regulates the passing position of the light beam under the control of the CPU; and
an image forming section which forms a latent image by causing the light beam from said light emitting unit to scan the surface to be scanned of said image carrier by means of said scanning member, turning the latent image into a visible image and transferring it on an image forming medium after the passing position of said light beam is controlled to the predetermined position.

22. The apparatus according to claim 21, wherein
said sensor of said light beam detecting section is formed by saw-toothed patterns.

23. The apparatus according to claim 21, wherein
said sensor of said light beam detecting section is formed by saw-toothed patterns narrowed for marginally located teeth at the downstream side or the upstream side relative to the main scanning direction.

24. An image forming apparatus for forming an image on an image forming medium, said apparatus comprising:
a light emitting unit which outputs a light beam;
an image carrier on which a latent image is formed by the light beam from the light emitting unit;
a scanning member which causes the light beam output from the light emitting unit to scan a surface to be scanned in a main scanning direction;
a sensor which is arranged on said surface to be scanned or at an equivalent position and formed by patterns adapted to detect the light beam at a timing corresponding to the scanning position of the light beam in a direction perpendicular to said main scanning direction;
an ON/OFF signal generating circuit which generates a first ON/OFF signal for producing an ON/OFF action and a second ON/OFF signal for producing an inverse ON/OFF action each time a light beam is detected by said sensor;
a first voltage source which outputs a voltage of a predetermined level according to said first ON/OFF signal;
a second voltage source which outputs a voltage of a predetermined level according to said second ON/OFF signal;
a processing circuit which outputs an integral value obtained by integrating the difference of the voltage from said first voltage source and the voltage from said second voltage source;
a CPU for determining the passing position of the light beam output from said light emitting unit on said surface to be scanned according to the value output from said processing circuit.
a light path modifying member which regulates a passing position of the light beam under the control of the CPU; and
an image forming section which forms a latent image by causing the light beam from said light emitting unit to scan the surface to be scanned of said image carrier by means of said scanning member, turning the latent image into a visible image and transferring it on an image forming medium after the passing position of said light beam is controlled to the predetermined position.

25. The apparatus according to claim 24, wherein
said sensor of said light beam detecting section is formed by saw-toothed patterns.

26. The apparatus according to claim 24, wherein
said sensor of said light beam detecting section is formed by saw-toothed patterns narrowed for marginally located teeth at the downstream side or the upstream side relative to the main scanning direction.

* * * * *